US012782327B2

(12) United States Patent
Shen et al.

(10) Patent No.: US 12,782,327 B2
(45) Date of Patent: Nov. 3, 2026

(54) METHOD AND SYSTEM FOR FLAME PHOTOMETRIC ONLINE DETECTION OF SULFUR-CONTAINING COMPOUND CONTENT IN NATURAL GAS

(71) Applicant: PetroChina Company Limited, Beijing (CN)

(72) Inventors: Lin Shen, Beijing City (CN); Xiaoqin Wang, Beijing City (CN); Li Zhou, Beijing City (CN); Xiaohong Li, Beijing City (CN); Ling Huang, Beijing City (CN); Zhenghua Chen, Beijing City (CN)

(73) Assignee: PETROCHINA COMPANY LIMITED, Beijing City (CN)

( * ) Notice: Subject to any disclaimer, the term of this patent is extended or adjusted under 35 U.S.C. 154(b) by 368 days.

(21) Appl. No.: 18/561,850

(22) PCT Filed: May 18, 2022

(86) PCT No.: PCT/CN2022/093508
§ 371 (c)(1),
(2) Date: Nov. 17, 2023

(87) PCT Pub. No.: WO2022/242669
PCT Pub. Date: Nov. 24, 2022

(65) Prior Publication Data
US 2024/0241091 A1 Jul. 18, 2024

(30) Foreign Application Priority Data
May 18, 2021 (CN) ........................ 202110539372.1

(51) Int. Cl.
*G01N 30/20* (2006.01)
*G01N 1/22* (2006.01)
(Continued)

(52) U.S. Cl.
CPC ............... *G01N 30/74* (2013.01); *G01N 1/22* (2013.01); *G01N 30/20* (2013.01);
(Continued)

(58) Field of Classification Search
CPC .......... G01N 30/74; G01N 1/22; G01N 30/20; G01N 2001/2285; G01N 2030/025;
(Continued)

(56) References Cited

U.S. PATENT DOCUMENTS 3,112,639 A 12/1963 Maxwell
4,293,308 A 10/1981 Sist
(Continued)

FOREIGN PATENT DOCUMENTS

CN 101126749 A 2/2008
CN 102141556 A 8/2011
(Continued)

OTHER PUBLICATIONS

Notice for grant issued for corresponding Japanese Patent Application 2023-571872 mailed on Feb. 4, 2025.
(Continued)

*Primary Examiner* — Robert R Raevis
(74) *Attorney, Agent, or Firm* — The Dobrusin Law Firm, P.C.; Daniela M. Thompson-Walters; Alexandria J. Janda

(57) ABSTRACT

The present invention provides a system for on-line flame photometric detection of the content of sulfur-containing compounds in natural gas. The system comprises a sampling device, a depressurization system, a chromatographic column system and a flame photometric detector; wherein the chromatographic column system is provided with a carrier gas input line, and a chromatographic column, comprising a boiling point column and a sulfur column, is provided in the chromatographic column system; the output port of the sampling device is in communication with the input port of
(Continued)

the depressurization system through a first delivery pipeline; the output port of the depressurization system is in communication with the input port of the boiling point column through a switchable connecting pipeline; the input port of the boiling point column and the input port of the sulfur column are each connected to the carrier gas input line through a switchable connecting pipeline; the output port of the boiling point column is in communication with the input port of the sulfur column through a switchable connecting pipeline; the output port of the sulfur column is in communication with the input port of the boiling point column through a switchable connecting pipeline; and the output port of the boiling point column and the output input port of the sulfur column are each connected to the input port of the flame photometric detector through a switchable connecting pipeline.

20 Claims, 11 Drawing Sheets

(51) Int. Cl.
*G01N 30/74* (2006.01)
*G01N 30/02* (2006.01)

(52) U.S. Cl.
CPC ................ *G01N 2001/2285* (2013.01); *G01N 2030/025* (2013.01); *G01N 2030/201* (2013.01)

(58) Field of Classification Search
CPC ......... G01N 2030/201; G01N 33/0047; G01N 2030/8804; G01N 2030/8854; G01N 30/88; G01N 33/225; G01N 30/16; G01N 30/02; G01N 30/04; G01N 2030/022; G01N 2030/027; G01N 2030/042; G01N 2030/884
USPC ..... 73/1.03, 1.06, 23.23, 23.38, 23.4, 23.41, 73/23.42, 863.21; 210/85, 198.2, 656; 422/70, 89
See application file for complete search history.

(56) References Cited

U.S. PATENT DOCUMENTS

| | | | |
|---|---|---|---|
| 5,116,764 | A | 5/1992 | Annino et al. |
| 2014/0024129 | A1 | 1/2014 | Meyer |
| 2019/0128783 | A1 | 5/2019 | Su |
| 2021/0364484 | A1 | 11/2021 | Zhang et al. |

FOREIGN PATENT DOCUMENTS

| | | | |
|---|---|---|---|
| CN | 202057632 | U | 11/2011 |
| CN | 102297916 | A | 12/2011 |
| CN | 103471877 | A | 12/2013 |
| CN | 103472156 | A | 12/2013 |
| CN | 203672845 | U | 6/2014 |
| CN | 103913519 | A | 7/2014 |
| CN | 104407075 | A | 3/2015 |
| CN | 107478742 | A | 12/2017 |
| CN | 108254468 | A | 7/2018 |
| CN | 108717106 | A | 10/2018 |
| CN | 108982203 | A | 12/2018 |
| CN | 109212046 | A | 1/2019 |
| CN | 110320251 | A | 10/2019 |
| CN | 110501448 | A | 11/2019 |
| CN | 110514755 | A | 11/2019 |
| CN | 111024829 | A | 4/2020 |
| CN | 111077258 | A | 4/2020 |
| CN | 211348073 | U | 8/2020 |
| GB | 1558594 | A | 1/1980 |
| JP | S5851963 | A | 3/1983 |
| JP | S59158059 | U | 10/1984 |
| JP | S6258163 | A | 3/1987 |
| JP | 2003344371 | A | 12/2003 |
| RU | 2426112 | C1 | 8/2011 |
| WO | 2013019585 | A2 | 2/2013 |

OTHER PUBLICATIONS

International Search Report and Written Opinion mailed Aug. 3, 2022, Application No. PCT/CN2022/093508—Translation Only of Search Report.
Deng Fan-feng et al., Application of micro gas chromatography in rapid analysis of conventional components and sulfides in natural gas, Natural Gas Chemical Industry (Partially translated).
Chinese Search Report issued on Apr. 28, 2021.
First Office Action and Search Report issued on Jun. 29, 2023, for counterpart Chinese patent application No. 202110539372.1 with machine EN translation.
GB17820-2018, Title: Natural Gas, dated Nov. 19, 2018; Jun. 1, 2019.
Grant-Decision issued on Jul. 22, 2024, for counterpart Russian Patent Application No. 2023132777, along with the English translation.
First Office Action issued for corresponding Japanese Patent Application 2023-571872 mailed on Nov. 5, 2024.

METHOD AND SYSTEM FOR FLAME PHOTOMETRIC ONLINE DETECTION OF SULFUR-CONTAINING COMPOUND CONTENT IN NATURAL GAS

CROSS-REFERENCE TO RELATED APPLICATIONS

The present application is a National Stage entry of International Application No. PCT/CN2022/093508, filed on May 18, 2022, which claims priority to Chinese Patent Application No. 202110539372.1, filed on May 18, 2021, both of which are hereby incorporated by reference in their entireties.

FIELD

The present invention belongs to the field of natural gas detection technology, and specifically relates to a method and a system for on-line flame photometric detection of the content of sulfur-containing compounds in natural gas.

BACKGROUND

With the growing demand for energy, the larger proportion of natural gas in the energy structure plays an important role in optimizing the energy structure, effectively solving the security of energy supply and ecological environmental protection, and realizing the sustainable development of economy and society. In order to improve the quality of natural gas products, the key technical indicators in the standard GB17820-2018 "Natural Gas", the core standard of the natural gas industry, have been further upgraded. The requirements are more detailed and strict, especially the technical indicator of total sulfur content in natural gas has been upgraded from 200 $mg/m^3$ to 20 $mg/m^3$, and the requirement on instantaneous value has been suggested.

At present, the total sulfur content of purified gas in each purification plant ranges from 10 $mg/m^3$ to 100 $mg/m^3$, and most of the purified gas has a $H_2S$ content of less than 6 $mg/m^3$. The key factor to reduce the sulfur content is to reduce the contents of carbon oxysulfide, mercaptan, and the like in the purified gas. Therefore, the natural gas purification process is imposed with new requirements, which must be accompanied by a fast and accurate measurement method.

Currently, the common detection method of total sulfur in purified gas and pipeline natural gas is still on-site sampling and subsequent detection by oxidative microcoulometry and ultraviolet fluorescence method in the laboratory. However, this method can no longer meet the current needs of the new production process control. With the gradual application of on-line detection technology of total sulfur in natural gas, UV absorption spectrometry and hydrolysis-rate meter colorimetry have been applied to the field of on-line detection of total sulfur in natural gas. However, due to the specificity of instrument configuration, technical parameters and application principle, there are still many problems in on-line application, which makes it not easy to be fully applied to on-line detection of total sulfur and sulfur-containing compounds in natural gas.

SUMMARY

The present invention aims to provide a system for on-line flame photometric detection of the content of sulfur-containing compounds in natural gas. This system enables fast and efficient on-line analysis and detection of the contents of at least 6 sulfur-containing compounds in natural gas.

In order to achieve the above object, the present invention provides a system for on-line flame photometric detection of the content of sulfur-containing compounds in natural gas, comprising: a sampling device, a depressurization system, a chromatographic column system and a flame photometric detector; the sampling device is used for on-line acquisition of natural gas to be analyzed in a natural gas pipeline; the flame photometric detector is used for combusting each of components delivered into the flame photometric detector to detect light transmission and convert it into an electrical signal so as to detect the content of sulfur-containing compounds in the natural gas to be analyzed; the chromatographic column system is provided with a carrier gas input line, and a chromatographic column, comprising a boiling point column and a sulfur column (for example, consisting of a boiling point column and a sulfur column), is provided in the chromatographic column system; the output port of the sampling device is in communication with the input port of the depressurization system through a first delivery pipeline; the output port of the depressurization system is in communication with the input port of the boiling point column through a switchable connecting pipeline; the input port of the boiling point column and the input port of the sulfur column are each connected to the carrier gas input line through a switchable connecting pipeline; the output port of the boiling point column is in communication with the input port of the sulfur column through a switchable connecting pipeline; the output port of the sulfur column is in communication with the input port of the boiling point column through a switchable connecting pipeline; and the output port of the boiling point column and the output port of the sulfur column are each connected to the input port of the flame photometric detector through a switchable connecting pipeline.

The system for on-line flame photometric detection of the content of sulfur-containing compounds in natural gas provided by the present invention can be well suitable for on-line analysis of the content of sulfur-containing compounds in natural gas in a natural gas pipeline, and is capable of detecting the content of at least six sulfur-containing compounds. The system for on-line flame photometric detection of the content of sulfur-containing compounds in natural gas provided by the present invention has the following beneficial effects:

(1) By means of the sampling device, the natural gas can be captured from the natural gas pipeline and delivered to the depressurization system in real time. The pressure of the natural gas is reduced by the depressurization system to adjust the flow rate of the natural gas, such that the natural gas enters the chromatographic column system at a moderate flow rate. The carrier gas is used to drive it in the column for separation, and the sulfur column and the boiling point column can better separate the sulfur compounds in the natural gas, and the flame photometric detector is then used to combust the components. The transmittance is detected and converted into an electrical signal, such that the content of the sulfur-containing compounds in the natural gas can be easily detected.

(2) Due to the unique connection of the components in the chromatographic column system of the present invention, the separation of at least 6 different sulfur-containing compounds in the natural gas can be realized more quickly and accurately, thereby improving the efficiency and accuracy of the detection of the sulfur-containing compounds in the natural gas. Specifically, by the unique connection of the components in the chromatographic column system of the present invention, it is possible to realize the separation of some of the components in the natural gas using a primary boiling point column and a primary sulfur column in sequence based on the chromatographic separation characteristics of the different components in the natural gas. Some of the components are separated using two boiling point columns and one sulfur column, in particular, the boiling point column, the sulfur column, and the boiling point column are used sequentially; and some of the components are separated using only one boiling point column.

(3) The system eliminates the need of existing cumbersome steps to obtain natural gas and then move it to a laboratory for detection, such that the detection of sulfur compounds in natural gas is much more efficient, which is also suitable for the current high demand for natural gas extraction.

(4) The system reduces the cost of detection and allows on-site detection for sulfur compounds in natural gas, which is very convenient and efficient.

BRIEF DESCRIPTION OF THE DRAWINGS

In order to more clearly illustrate the technical solutions in the embodiments of the present invention, the accompanying drawings to be used in the description of the embodiments will be briefly described below. Obviously, the accompanying drawings in the following description only include some embodiments of the present invention. For a person of ordinary skill in the art, other drawings can be obtained based on these drawings without paying creative labor.

DETAILED DESCRIPTION

Figure 1:
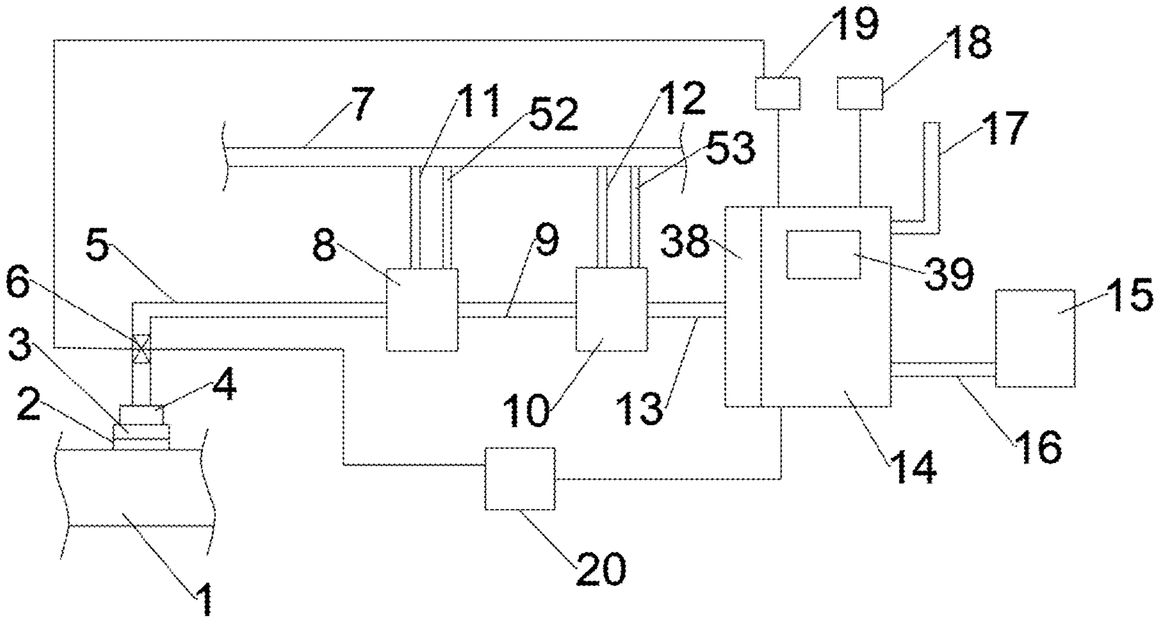
FIG. 1 is a schematic structural diagram of a system for on-line flame photometric detection of the content of sulfur-containing compounds in natural gas according to an example of the present invention.

In order to achieve the above object, the present invention provides a system for on-line flame photometric detection of the content of sulfur-containing compounds in natural gas, comprising: a sampling device, a depressurization system, a chromatographic column system and a flame photometric detector; the sampling device is used for on-line acquisition of natural gas to be analyzed in a natural gas pipeline; the flame photometric detector is used for combusting each of components delivered into the flame photometric detector to detect light transmission and convert it into an electrical signal so as to detect the content of sulfur-containing compounds in the natural gas to be analyzed; the chromatographic column system is provided with a carrier gas input line, and a chromatographic column, comprising a boiling point column and a sulfur column (for example, consisting of a boiling point column and a sulfur column), is provided in the chromatographic column system; the output port of the sampling device is in communication with the input port of the depressurization system through a first delivery pipeline; the output port of the depressurization system is in communication with the input port of the boiling point column through a switchable connecting pipeline; the input port of the boiling point column and the input port of the sulfur column are each connected to the carrier gas input line through a switchable connecting pipeline; the output port of the boiling point column is in communication with the input port of the sulfur column through a switchable connecting pipeline; the output port of the sulfur column is in communication with the input port of the boiling point column through a switchable connecting pipeline; and the output port of the boiling point column and the output port of the sulfur column are each connected to the input port of the flame photometric detector through a switchable connecting pipeline.

In the system for on-line flame photometric detection of the content of sulfur-containing compounds in natural gas, preferably, the sampling device comprises a mounting base and a sampling probe fixedly connected to the mounting base and in communication with the first delivery pipeline; and the sampling probe is mounted to a natural gas pipeline through the mounting base to enable the sampling device to be fixed to the natural gas pipeline, thereby realizing on-line acquisition of natural gas in the natural gas pipeline by means of the sampling probe placed inside the natural gas pipeline. More preferably, the sampling probe is provided with a self-tracing depressurizer. This preferred technical solution is more conducive to carry out sampling of natural gas in the natural gas pipeline with good sampling results.

In the system for on-line flame photometric detection of the content of sulfur-containing compounds in natural gas, preferably, the first delivery pipeline is provided with a first valve by which the first delivery pipeline is opened or closed.

In the system for on-line flame photometric detection of the content of sulfur-containing compounds in natural gas, preferably, a filter mesh is provided in the first delivery pipeline.

In the system for on-line flame photometric detection of the content of sulfur-containing compounds in natural gas, preferably, the depressurization system comprises a primary depressurizing component and a secondary depressurizing component connected in sequence; the input port of the secondary depressurizing component is in communication with the output port of the primary depressurizing component through a second delivery pipeline; the input port of the primary depressurizing component, as the input port of the depressurization system, is in communication with the output port of the sampling device through the first delivery pipeline; and the output port of the secondary depressurizing component, as the output port of the depressurization system, is in communication with the input port of the boiling point column through a switchable connecting pipeline.

In this preferred technical solution, by providing the primary depressurizing component and the secondary depressurizing component to depressurize the natural gas to be analyzed, the system is better suited for on-line analysis of sulfur-containing compounds in natural gas in the natural gas pipeline. This enables precise control of the depressurization of the natural gas from the gas pipeline and better adjustment of the flow rate of natural gas.

More preferably, the primary depressurizing component comprises a primary depressurizing tank, a first heating membrane depressurizer, a second heating membrane depressurizer, a first pressure gauge and a second pressure gauge, wherein the first heating membrane depressurizer, the second heating membrane depressurizer, the first pressure gauge and the second pressure gauge are each placed inside the primary depressurizing tank; a first connecting pipe is provided between the first heating membrane depressurizer and the second heating membrane depressurizer, and the first connecting pipe has one end in communication with the output port of the first heating membrane depressurizer and the other end in communication with the input port of the second heating membrane depressurizer; the first pressure gauge is mounted on the first connecting pipe and is in communication with the first connecting pipe; the other end of the first delivery pipeline passes into the primary depressurizing tank and is in communication with the input port of the first heating membrane depressurizer; one end of the second delivery pipeline passes into the primary depressurizing tank and is in communication with the output port of the second heating membrane depressurizer; and the second pressure gauge is mounted on the second delivery pipeline and is in communication with the second delivery pipeline; more preferably, the primary depressurizing component further comprises a primary thermal insulation layer laid on the inner wall of the primary depressurizing tank.

In this preferred technical solution, by providing the first heating membrane depressurizer and the second heating membrane depressurizer, a dual function is formed, which makes the depressurizing effect significant and efficient, and is more conducive to the depressurizing operation of natural gas during the process of on-line analysis of sulfur-containing compounds in natural gas in the natural gas pipeline.

More preferably, the secondary depressurizing component comprises a secondary depressurizing tank, a knob-type depressurizer, a second connecting pipe and a third pressure gauge, wherein the knob-type depressurizer, the second connecting pipe and the third pressure gauge are each placed inside the secondary depressurizing tank; one end of the second delivery pipeline passes into the secondary depressurizing tank and is in communication with the input port of the knob-type depressurizer; the second connecting pipe has one end in communication with the output port of the knob-type depressurizer and the other end in communication with one end of the third pressure gauge; and the other end of the third pressure gauge, as the output port of the secondary depressurizing component, is in communication with the input port of the boiling point column through a switchable connecting pipeline; further preferably, the secondary depressurizing component further comprises a secondary thermal insulation layer laid on the inner wall of the secondary depressurizing tank.

In this preferred technical solution, the pressure of the gas to be analyzed is further reduced through a secondary depressurization by using a knob-type depressurizer, which facilitates the control of the flow rate of the gas during the on-line analysis of sulfur-containing compounds in natural gas in the gas pipeline.

In the system for on-line flame photometric detection of the content of sulfur-containing compounds in natural gas, preferably, the system for on-line flame photometric detection of the content of sulfur-containing compounds in natural gas further comprises a circulating tracer tube; wherein the depressurization system is further provided with a tracer component; and the circulating tracer tube is in communication with the tracer component of the depressurization system, so as to heat the natural gas to be analyzed in the depressurization system. This preferred technical solution can prevent condensation during the depressurization of natural gas during on-line analysis of sulfur-containing compounds in natural gas in the natural gas pipeline.

More preferably, a primary heating tube and a primary discharge pipe are provided between the circulating tracer tube and the primary depressurizing component, wherein the primary heating tube has one end in communication with the circulating tracer tube and the other end in communication with one end of the primary depressurizing component, the primary discharge pipe has one end in communication with the other end of the primary depressurizing component and the other end in communication with the circulating tracer tube; a secondary heating tube and a secondary discharge pipe are provided between the circulating tracer tube and the secondary depressurizing component, wherein the secondary heating tube has one end in communication with the circulating tracer tube and the other end in communication with one end of the secondary depressurizing component, the secondary discharge pipe has one end in communication with the other end of the secondary depressurizing component and the other end in communication with the circulating tracer tube.

In a specific embodiment, the primary heating tube has one end in communication with the circulating tracer tube and the other end in communication with the tracer inlet of the first heating membrane depressurizer and the tracer inlet of the second heating membrane depressurizer, respectively, for heating the first heating membrane depressurizer and the second heating membrane depressurizer, so as to prevent condensation during the depressurization of natural gas to be analyzed; the primary discharge pipe has one end in communication with the circulating tracer tube and the other end in communication with the tracer outlet of the first heating membrane depressurizer and the tracer outlet of the second heating membrane depressurizer, respectively.

In a specific embodiment, the secondary heating tube has one end in communication with the circulating tracer tube and the other end of the tracer inlet of the knob-type depressurizer for heating the knob-type depressurizer, so as to prevent condensation during the depressurization of natural gas to be analyzed; the secondary discharge pipe has one end in communication with the circulating tracer tube and the other end of the tracer outlet of the knob-type depressurizer.

In the system for on-line flame photometric detection of the content of sulfur-containing compounds in natural gas, preferably, the chromatographic column system is provided with a quantization tube for temporarily storing the natural gas to be analyzed, which enters the chromatographic column system, to enable quantification of the natural gas to be analyzed for separation of sulfur-containing compounds using the chromatographic column system.

In the system for on-line flame photometric detection of the content of sulfur-containing compounds in natural gas, preferably, the chromatographic column system is provided with a ten-way valve through which the communication between the components in the chromatographic column is switchable.

More preferably, the ten-way valve is provided with a first valve port, a second valve port, a third valve port, a fourth valve port, a fifth valve port, a sixth valve port, a seventh valve port, an eighth valve port, a ninth valve port and a tenth valve port clockwise; the ten-way valve is an adjustable valve and can be tap controlled to realize the communication between the first valve port and the second valve port, the communication between the third valve port and the fourth valve port, the communication between the fifth valve port and the sixth valve port, the between the ninth valve port and the tenth valve port in one tap position, and the communication between the tenth valve port and the first valve port, the communication between the second valve port and the third valve port, the communication between the fourth valve port and the fifth valve port, the communication between the sixth valve port and the seventh valve port and the communication between the eighth valve port and the ninth valve port in another tap position; one of the tenth valve port and the ninth valve port of the ten-way valve is in communication with the output port of the depressurization system through a third delivery pipeline, the natural gas to be analyzed enters through the tenth or ninth valve port of the ten-way valve, and the other of them is used to vent excess gas; a quantization tube is provided between the first valve port and the eighth valve port of the ten-way valve for temporarily storing the natural gas to be analyzed, so as to enable quantification of the natural gas to be analyzed, and the first valve port of the ten-way valve is in communication with the eighth valve port of the ten-way valve through the quantization tube; the carrier gas input line is in communication with the second valve port of the ten-way valve; the boiling point column is provided between the fourth valve port and the seventh valve port of the ten-way valve, such that the fourth valve port of the ten-way valve is in communication with the seventh valve port of the ten-way valve through the boiling point column; the sulfur column is provided between the third valve port and the sixth valve port of the ten-way valve, such that the third valve port of the ten-way valve is in communication with the sixth valve port of the ten-way valve through the sulfur column; the fifth valve port of the ten-way valve is in communication with the flame photometric detector.

In a specific embodiment, the ten-way valve is provided with a first valve port, a second valve port, a third valve port, a fourth valve port, a fifth valve port, a sixth valve port, a seventh valve port, an eighth valve port, a ninth valve port and a tenth valve port clockwise; the ten-way valve is an adjustable valve and can be tap controlled to realize the communication between the first valve port and the second valve port, the communication between the third valve port and the fourth valve port, the communication between the fifth valve port and the sixth valve port, the between the ninth valve port and the tenth valve port in one tap position, and the communication between the tenth valve port and the first valve port, the communication between the second valve port and the third valve port, the communication between the fourth valve port and the fifth valve port, the communication between the sixth valve port and the seventh valve port and the communication between the eighth valve port and the ninth valve port in another tap position; the output port of the depressurization system is in communication with the tenth valve port of the ten-way valve through a third delivery pipeline, and the natural gas to be analyzed enters through the tenth valve port of the ten-way valve; the ninth valve port of the ten-way valve is used to vent excess gas; a quantization tube is provided between the first valve port and the eighth valve port of the ten-way valve for temporarily storing the natural gas to be analyzed, so as to enable quantification of the natural gas to be analyzed; the first valve port of the ten-way valve is in communication with the eighth valve port of the ten-way valve through the quantization tube; the carrier gas input line is in communication with the second valve port of the ten-way valve; the boiling point column is provided between the fourth valve port and the seventh valve port of the ten-way valve, such that the fourth valve port of the ten-way valve is in communication with the seventh valve port of the ten-way valve through the boiling point column; the sulfur column is provided between the third valve port and the sixth valve port of the ten-way valve, such that the third valve port of the ten-way valve is in communication with the sixth valve port of the ten-way valve through the sulfur column; the fifth valve port of the ten-way valve is in communication with the flame photometric detector.

In a specific embodiment, the ten-way valve is provided with a first valve port, a second valve port, a third valve port, a fourth valve port, a fifth valve port, a sixth valve port, a seventh valve port, an eighth valve port, a ninth valve port and a tenth valve port clockwise; the ten-way valve is an adjustable valve and can be tap controlled to realize the communication between the first valve port and the second valve port, the communication between the third valve port and the fourth valve port, the communication between the fifth valve port and the sixth valve port, the between the ninth valve port and the tenth valve port in one tap position, and the communication between the tenth valve port and the first valve port, the communication between the second valve port and the third valve port, the communication between the fourth valve port and the fifth valve port, the communication between the sixth valve port and the seventh valve port and the communication between the eighth valve port and the ninth valve port in another tap position; the output port of the depressurization system is in communication with the ninth valve port of the ten-way valve through a third delivery pipeline, and the natural gas to be analyzed enters through the ninth valve port of the ten-way valve; the tenth valve port of the ten-way valve is used to vent excess gas; a quantization tube is provided between the first valve port and the eighth valve port of the ten-way valve for temporarily storing the natural gas to be analyzed, so as to enable quantification of the natural gas to be analyzed; the first valve port of the ten-way valve is in communication with the eighth valve port of the ten-way valve through the quantization tube; the carrier gas input line is in communication with the second valve port of the ten-way valve; the boiling point column is provided between the fourth valve port and the seventh valve port of the ten-way valve, such that the fourth valve port of the ten-way valve is in communication with the seventh valve port of the ten-way valve through the boiling point column; the sulfur column is provided between the third valve port and the sixth valve port of the ten-way valve, such that the third valve port of the ten-way valve is in communication with the sixth valve port of the ten-way valve through the sulfur column; the fifth valve port of the ten-way valve is in communication with the flame photometric detector.

In the system for on-line flame photometric detection of the content of sulfur-containing compounds in natural gas, preferably, the boiling point column is a squalane column. More preferably, the boiling point column has a length of not less than 0.8 m, preferably 0.6 m. This preferred technical solution facilitates the separation of sulfur-containing compounds in natural gas.

In the system for on-line flame photometric detection of the content of sulfur-containing compounds in natural gas, preferably, the sulfur column is an oxydipropionitrile column. More preferably, the sulfur column has a length of not less than 1.7 m. This preferred technical solution facilitates the separation of sulfur-containing compounds in natural gas.

In the system for on-line flame photometric detection of the content of sulfur-containing compounds in natural gas, preferably, the system for on-line flame photometric detection of the content of sulfur-containing compounds in natural gas further comprises a display fixedly connected to the flame photometry detector; wherein the display is electrically connected to the flame photometry detector, and shows detection results of the flame photometry detector.

In the system for on-line flame photometric detection of the content of sulfur-containing compounds in natural gas, preferably, the system for on-line flame photometric detection of the content of sulfur-containing compounds in natural gas further comprises an alarm linkage device and a combustible gas detection alarm, both of which are electrically connected to the flame photometry detector; wherein the combustible gas detection alarm is used to detect whether combustible gas leakage occurs in the vicinity of the flame photometry detector to avoid potential safety hazards, and the alarm linkage device is a controller, and will close the first delivery pipeline in time such that the delivery of the gas to be detected will stop when the combustible gas detection alarm detects the leakage of combustible gas to further avoid possible accidents.

The beneficial effect of adopting the above preferable solution is to avoid leakage of combustible gases and to avoid accidents.

In the system for on-line flame photometric detection of the content of sulfur-containing compounds in natural gas, preferably, the system for on-line flame photometric detection of the content of sulfur-containing compounds in natural gas further comprises a standard gas substance storage bottle, wherein a standard gas substance delivery pipe is provided between the standard gas substance storage bottle and the chromatographic column system; the standard gas substance delivery pipe has one end in communication with the input port of the chromatographic column system, and the other end in communication with the output port of the standard gas substance storage bottle; and the standard gas substance delivery pipe is provided with a second valve through which the standard gas substance delivery pipe is opened or closed.

This preferred technical solution facilitates the use of standard gas substances for calibration on a batch-by-batch or daily basis, which can further improve the accuracy of the detection of sulfur-containing compounds in natural gas to be analyzed.

The present invention provides a method for on-line flame photometric detection of the content of sulfur-containing compounds in natural gas, comprises the steps of:

S1: obtaining a standard gas substance of sulfur-containing compounds and detecting the standard gas substance of sulfur-containing compounds for the content of sulfur-containing compounds to obtain the standard curve of the content of sulfur-containing compounds;

S2: obtaining the natural gas delivered in a natural gas pipeline using the sampling device, and delivering the natural gas to the depressurization system for depressurization to obtain the depressurized natural gas;

S3: delivering the depressurized natural gas obtained from step S2 to the chromatographic column system, separating the depressurized natural gas driven by a carrier gas using the boiling point column and the sulfur column in turn, and delivering the separated components to the flame photometric detector for combustion detection by the flame photometric detector to obtain a detection profile;

S4: switching the carrier gas to the input port of the sulfur column when the carbonyl sulfide (carbon oxysulfide) component in the natural gas leaves the sulfur column in step S2, wherein the output port of the sulfur column is in communication with the input port of the boiling point column, and the output port of the boiling point column is in communication with the input port of the flame photometric detector; continually separating the remaining components using the column system driven by the carrier gas, and delivering the separated components obtained at the output port of the boiling point column to the flame photometric detector for combustion detection by the flame photometric detector to obtain a detection profile;

S5: deriving the content of sulfur-containing compounds in the natural gas from the response peak area values obtained from the detection profiles obtained in steps S3 and S4 and the standard curve of content of sulfur-containing compounds obtained from step S1.

The method for on-line flame photometric detection of the content of sulfur-containing compounds in natural gas provided by the present invention is capable of on-line detection of sulfur-containing compounds in natural gas. The detection operation is simple, and the content of the sulfur-containing compounds in the natural gas can be derived by only simple calculation, which enables easy on-site operation and does not need to send samples to a laboratory specifically for detection. This reduces the production cost, accelerates the detection efficiency of the sulfur-containing compounds in the natural gas and improves the detection accuracy of the sulfur-containing compounds in the natural gas.

In the method for on-line flame photometric detection of the content of sulfur-containing compounds in natural gas, in step S3, the depressurized natural gas is separated sequentially using a boiling point column and a sulfur column driven by a carrier gas. Hydrogen sulfide, carbonyl sulfide, methyl mercaptan and ethyl mercaptan from the sulfur compounds are sequentially discharged from the boiling point column (with a very small time difference between the hydrogen sulfide and carbonyl sulfide) into the sulfur column for separation, with further increasing the separation time difference between the components. The hydrogen sulfide and carbonyl sulfur are sequentially discharged from the sulfur column into the flame photometric detector for combustion detection by the flame photometric detector. In step S4, until the carbonyl sulfur component of the natural gas leaves the sulfur column (at this time, the ethyl sulfide component is about to be discharged from the boiling point column), the carrier gas is transferred to the input port of the sulfur column. The output port of the sulfur column is in communication with the input port of the boiling point column, and the output port of the boiling point column is in communication with the input port of the flame photometric detector. The remaining components driven by the carrier gas continue to be separated using the column system, and the components such as ethyl mercaptan, n-butyl mercaptan, methyl mercaptan, and ethyl mercaptan are sequentially discharged from the boiling point column into the flame photometric detector for combustion detection by the flame photometric detector. During the whole separation process, some components of natural gas, such as hydrogen sulfide and carbonyl sulfide, are separated in turn using boiling point column for one time and sulfur column for one time; some components of natural gas, such as methyl mercaptan and ethyl mercaptan, were separated using boiling point columns twice and sulfur column for one time, specifically using the boiling point column, the sulfur column and the boiling point column in sequence; and some components of natural gas, such as ethyl sulfide and n-butyl mercaptan, are separated using the boiling point column for only one time.

In the method for on-line flame photometric detection of the content of sulfur-containing compounds in natural gas, preferably, the depressurized natural gas obtained from step S2 has a pressure of 0.18-0.25 MPa (e.g., 0.2 MPa). In a specific embodiment, the obtained natural gas delivered in the natural gas pipeline is transported via the first delivery pipeline to a primary depressurizing component, whereby the pressure of the natural gas is reduced to 1.8-2.5 MPa (e.g., 2 MPa). Subsequently, it is transported via the second delivery pipeline to a secondary depressurizing component, whereby the pressure of the natural gas is reduced to 0.18-0.25 MPa (e.g., 0.2 MPa), to obtain a depressurized natural gas.

In the method for on-line flame photometric detection of the content of sulfur-containing compounds in natural gas, preferably, the sulfur column, when used for separation, has an operating temperature of 55-65° C. (e.g., 62° C.).

In the method for on-line flame photometric detection of the content of sulfur-containing compounds in natural gas, preferably, the boiling point column, when used for separation, has an operating temperature of 65-75° C. (e.g., 70° C.).

In the method for on-line flame photometric detection of the content of sulfur-containing compounds in natural gas, preferably, the carrier gas is nitrogen.

In the method for on-line flame photometric detection of the content of sulfur-containing compounds in natural gas, preferably, the carrier gas has a flow rate of 22 ml/min.

In the method for on-line flame photometric detection of the content of sulfur-containing compounds in natural gas, preferably, delivering the separated components to the flame photometric detector for combustion detection by the flame photometric detector is carried out in the following manner:

delivering the separated components to the flame photometric detector filled with hydrogen at a pressure of 0.24 MPa and a flow rate of 40 ml/min and air at a pressure of 0.24 MPa and a flow rate of 80 ml/min, and performing the combustion detection using the flame photometric detector at 150° C.

In the method for on-line flame photometric detection of the content of sulfur-containing compounds in natural gas, preferably, obtaining the standard gas substance of sulfur-containing compounds and detecting the standard gas substance of sulfur-containing compounds for the content of sulfur-containing compounds to obtain the standard curve of the content of sulfur-containing compounds comprises the steps of:

S11: preparing the standard gas substance from methane together with hydrogen sulfide, carbonyl sulfide, methyl mercaptan, ethyl mercaptan, ethyl sulfide and n-butyl mercaptan, wherein at least 4 groups of standard gas substances with different concentrations of sulfur-containing compounds are prepared;

S12: detecting each of the standard gas substances obtained from step S11 to obtain the corresponding response peak area value data, and plotting a standard curve of the content of each sulfur-containing compound with the concentration of each sulfur-containing compound as a vertical coordinate and the corresponding response peak area value of each sulfur-containing compound as a horizontal coordinate; wherein the sulfur-containing compounds used in the standard gas substance are determined based on the type of sulfur-containing compounds in the natural gas to be tested; the standard gas substance generally has a majority component as a base gas, and the standard gas substance of sulfur-containing compounds in natural gas is formulated with reference to the actual component in natural gas. The majority component in natural gas is methane, which is used as the base gas or supplementary gas to obtain a specific content of the standard gas substance of sulfur-containing compounds, when formulating the standard gas substance of sulfur-containing compounds.

The use of this preferred technical solution is more conducive to calculating the content of sulfur-containing compounds in the natural gas.

Examples

In order to make the technical solutions and advantages of the examples of the present invention more clear, the technical solutions in the examples of the present invention will be described clearly and completely in the following in conjunction with the accompanying drawings in the examples of the present invention. Obviously, the described examples are a part of the examples of the present invention and not all of the examples. Based on the examples in the present invention, all other examples obtained by a person of ordinary skill in the art without making creative labor fall within the protection scope of the present invention.

The principle and spirit of the present invention are described in detail below with reference to several representative examples of the present invention.

As shown in FIGS. 1 to 4D, this example provides a system for on-line flame photometric detection of the content of sulfur-containing compounds in natural gas, comprising: a sampling device, a depressurization system, a chromatographic column system 38, and a flame photometric detector (FPD) 14; wherein the chromatographic column system includes a carrier gas input line, a boiling point column 40, and a sulfur column 41.

The sampling end of the sampling device is placed in a natural gas pipeline 1 for on-line acquisition of natural gas delivered in the natural gas pipeline 1. A part of natural gas in the natural gas pipeline 1 enters the sampling device via the natural gas transmission power.

A first delivery pipeline 5 is provided between the sampling device and the depressurization system; the first delivery pipeline 5 has one end fixedly connected to and in communication with the output port of the sampling device and the other end fixedly connected to and in communication with the input port of the depressurization system, such that the natural gas obtained by the sampling device enters into the depressurization system for depressurization through the first delivery pipeline 5.

A third delivery pipeline 13 is provided between the chromatographic column system 38 and the depressurization system. The third delivery pipeline 13 has one end fixedly connected to and in communication with the output port of the depressurization system and the other end fixedly connected to and in communication with the input port of the chromatographic column system 38. The input port of the chromatographic column system 38 is in communication with the input port of the boiling point column 40 through a switchable connecting pipeline. The input port of the boiling point column 40 and the input port of the sulfur column 41 are each connected to the carrier gas input line through a switchable connecting pipeline. The output port of the boiling point column 40 is in communication with the input port of the sulfur column 41 through a switchable connecting pipeline. The output port of the sulfur column 41 is in communication with the input port of the boiling point column 40 through a switchable connecting pipeline; and the output port of the boiling point column 40 and the output input port of the sulfur column 41 are each connected to the input port of a flame photometric detector 14 through a switchable connecting pipeline. The depressurized natural gas enters the chromatographic column system 38 where it is separated under the action of the carrier gas.

The flame photometric detector 14 is used to combust the components, and the transmittance is detected and converted into an electrical signal, such that the content of the sulfur-containing compounds in the natural gas to be analyzed can be detected. The compounds separated from the natural gas are detected by combustion in a flame photometric detector 14. The flame photometric detector 14 is a known instrument, which is a highly selective detector with high sensitivity and produces a detection signal only for sulfur- and phosphorus-containing organics. The principle of sulfur detection is that, in a hydrogen-rich flame, the combustion of sulfur-containing organic substances emits a characteristic blue-violet light with a wavelength of 350 nm-430 nm and a maximum intensity of 394 nm, which is then is filtered by a light filter, and the intensity change of the characteristic light is measured by a photomultiplier tube and converted into an electrical signal, from which the sulfur content can be detected.

Preferably, in this example, the sampling device comprises a mounting base 3 and a sampling probe 4 fixedly connected to the mounting base 3. The sampling probe 4 is provided with a self-tracing depressurizer and in communication with the first delivery pipeline 5. The mounting base 3 is mounted on the natural gas pipeline 1, wherein the natural gas pipeline 1 is provided with a detection port 2; the mounting base 3 and the detection port 2 are equipped with connection flanges, through which they can be easily connected; the sampling probe 4 is placed inside the natural gas pipeline 1, wherein the sampling probe 4 is in communication with the first delivery pipeline 5, and the natural gas in the natural gas pipeline 1 enters into the sampling probe 4 and then into the first delivery pipeline 5.

Preferably, in this example, the first delivery pipeline 5 is provided with a first valve 6 and a filter mesh. The first valve 6 is mounted on the first delivery pipeline 5 to open or close the first delivery pipeline 5. The first valve 6 is a solenoid valve, which can be controlled by an electrical signal, thereby making operation more convenient. The filter mesh is a 120-160 mesh filter mesh, which is capable of filtering out the particulate impurities contained in the natural gas.

Preferably, in this example, the depressurization system comprises a primary depressurizing component 8 and a secondary depressurizing component 10. A first delivery pipeline 5 is provided between the primary depressurizing component 8 and the sampling device. The first delivery pipeline 5 has one end fixed connected to and in communication with the output port of the sampling device, and the other end fixed connected to and in communication with the input port of the primary depressurizing component 8, as the input port of the depressurization system, such that the natural gas obtained by the sampling device enters into the primary depressurizing component 8 for depressurization through the first delivery pipeline 5. A second delivery pipeline 9 is provided between the secondary depressurizing component 10 and the primary depressurizing component 8; the second delivery pipeline 9 has one end fixed connected to and in communication with the output port of the primary depressurizing component 8, and the other end fixed connected to and in communication with the input port of the secondary depressurizing component 10. The natural gas is depressurized by the primary depressurizing component 8 before entering the secondary depressurizing component 10 for secondary depressurization.

Figure 2:
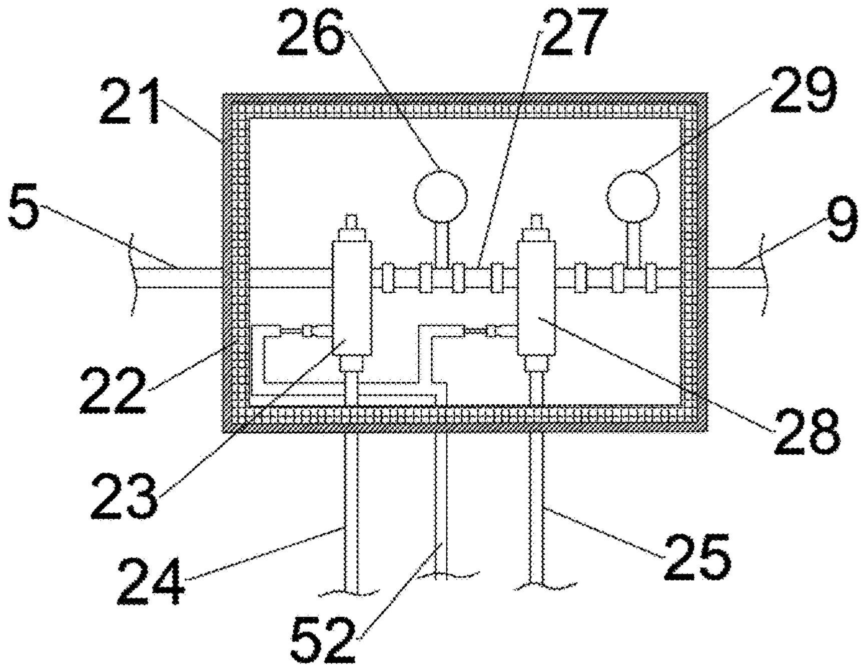
FIG. 2 is a schematic structural diagram of a primary depressurizing component according to an example of the present invention.

Preferably, in this example, as shown in FIG. 2, the primary depressurizing component 8 comprises a primary depressurizing tank 21, a primary thermal insulation layer 22, a first heating membrane depressurizer 23, a second heating membrane depressurizer 28, a first pressure gauge 26 and a second pressure gauge 29. The primary thermal insulation layer 22 is laid on the inner wall of the primary depressurizing tank 21. The first heating membrane depressurizer 23, the second heating membrane depressurizer 28, the first pressure gauge 26 and the second pressure gauge 29 are each placed inside the primary depressurizing tank 21. A first connecting pipe 27 is provided between the first heating membrane depressurizer 23 and the second heating membrane depressurizer 28. The first connecting pipe 27 has one end in communication with the output port of the first heating membrane depressurizer 23 and the other end in communication with the input port of the second heating membrane depressurizer 28. The first pressure gauge 26 is mounted on the first connecting pipe 27 and is in communication with the first connecting pipe 27; the other end of the first delivery pipeline 5 passes into the primary depressurizing tank 21 and is in communication with the input port of the first heating membrane depressurizer 23. One end of the second delivery pipeline 9 passes into the primary depressurizing tank 21 and is in communication with the output port of the second heating membrane depressurizer 28; and the second pressure gauge 29 is mounted on the second delivery pipeline 9 and is in communication with the second delivery pipeline 9. The depressurization effect of the natural gas via the first heating membrane depressurizer 23 is observed via the first pressure gauge 26, thereby obtaining the real-time pressure of the natural gas. The depressurization effect of the natural gas via the second heating membrane depressurizer 28 is observed via the second pressure gauge 29, thereby obtaining the real-time pressure of the natural gas, such that the depressurization effect is adjusted, thereby increasing the accuracy of the natural gas detection. The first heating membrane depressurizer 23, the second heating membrane depressurizer 28, the first pressure gauge 26 and the second pressure gauge 29 are all known equipments in the art, and the primary thermal insulation layer 22 is made of a polymeric thermal insulation material.

Figure 3:
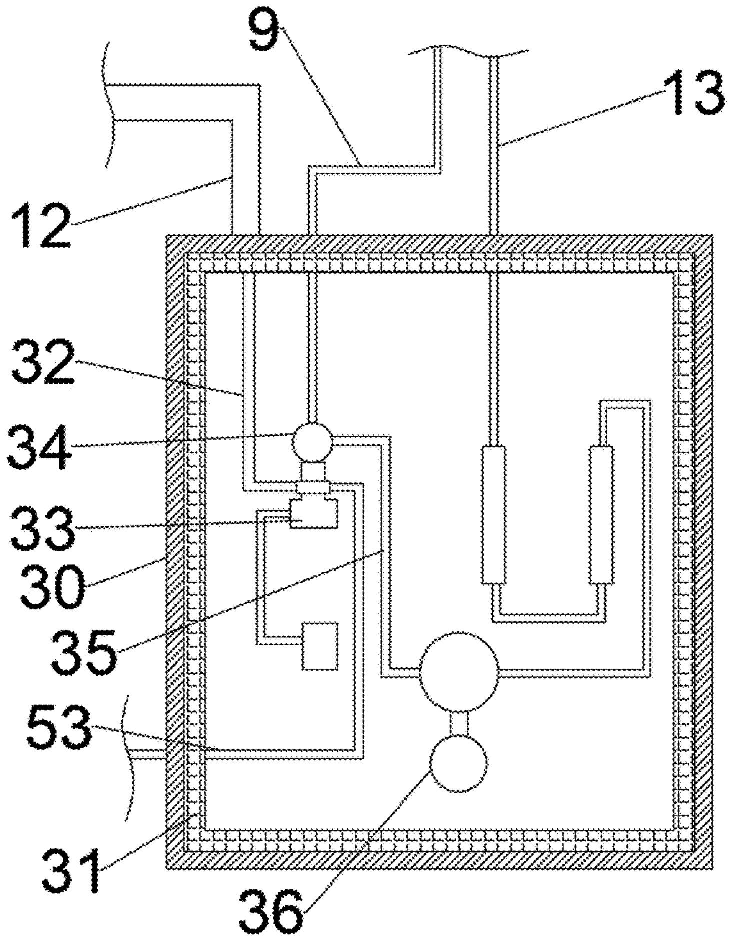
FIG. 3 is a schematic structural diagram of a secondary depressurizing component according to an example of the present invention.

Preferably, in this example, as shown in FIG. 3, the secondary depressurizing component 10 comprises a secondary depressurizing tank 30, a secondary thermal insulation layer 31, a knob-type depressurizer 34, a second connecting pipe 35 and a third pressure gauge 36. The secondary thermal insulation layer 31 is laid on the inner wall of the secondary depressurizing tank 30. The knob-type depressurizer 34, the second connecting pipe 35 and the third pressure gauge 36 are each placed inside the secondary depressurizing tank 30. One end of the second delivery pipeline 9 passes into the secondary depressurizing tank 30 and is in communication with the input port of the knob-type depressurizer 34. The second connecting pipe 35 has one end in communication with the output port of the knob-type depressurizer 34 and the other end in communication with one end of the third pressure gauge 36; and one end of the third delivery pipeline 13 is in communication with the other end of the third pressure gauge 13. The pressure of the natural gas depressurized by the knob-type depressurizer 34 is detected by the third pressure gauge 36 so as to control the flow rate of the natural gas, for more accurate detection of the content of sulfur-containing compounds in the natural gas. The secondary thermal insulation layer 31 is made of polymer material, and both the third pressure gauge 36 and the knob type depressurizer 34 are known equipments in the art.

Preferably, in this example, the secondary depressurization tank 30 is further provided with an alarm 33, which is able to detect if there is a natural gas leakage so that an alarm can be issued in time.

Preferably, in this example, the system further comprises a circulating tracer tube 7 for supplying high temperature gases. A primary heating tube 11 and a primary discharge pipe 52 are provided between the circulating tracer tube 7 and the primary depressurizing component 8. The primary heating tube 11 has one end in communication with the circulating tracer tube 7 and the other end in communication with the tracer inlet of the primary depressurizing component 8. The primary discharge pipe 52 has one end in communication with the tracer outlet of the primary depressurizing component 8 and the other end in communication with the circulating tracer tube 7. One end of the primary heating tube 11 is connected to a first hot gas pipe 24 and a second hot gas pipe 25. The first hot gas pipe 24 is in communication with the tracer inlet of the first heating membrane depressurizer 23, and the second hot gas pipe 25 is in communication with the tracer inlet of the second heating membrane depressurizer 28, so as to heat the first heating membrane depressurizer 23 and the second heating membrane depressurizer 28, thereby preventing condensation during the depressurization of natural gas. The primary discharge pipe 52 is in communication with the tracer outlet of the first heating membrane depressurizer 23 and the tracer outlet of the second heating membrane depressurizer 28, respectively. A secondary heating tube 12 and a secondary discharge pipe 53 are provided between the circulating tracer tube 7 and the secondary depressurizing component 10. The secondary heating tube 12 has one end in communication with the circulating tracer tube 7 and the other end in communication with the tracer inlet of secondary depressurizing component 10. The secondary discharge pipe 53 has one end in communication with the tracer outlet of the secondary depressurizing component 10 and the other end in communication with the circulating tracer tube 7. A third hot gas pipe 32 is provided in the secondary depressurizing tank 30, and the third hot gas pipe 32 has one end connected to and in communication with the secondary heating tube 12, and the other end in communication with the tracer inlet of the knob-type depressurizer 34, so as to prevent condensation during the depressurization of natural gas. The secondary discharge pipe 53 is in communication with the tracer outlet of the knob-type depressurizer 34.

Since sulphur-containing compounds are highly susceptible to adsorption to or chemical reaction with various materials, the sampling probe, the mounting base 3, the first valve 6, the first delivery pipeline 5, the second delivery pipeline 9, the third delivery pipeline 13, or the like, should be made of suitable sulphur-inert or passivated materials. The selected materials should be compatible with the gas and the sampling method, and the internal and external conditions of the sampling device should ensure that the composition of the gas to be sampled is not degraded and is not changed. The sampling probe should be located in the natural gas pipeline 1 horizontally set, and should not be located in a corner or in the middle section, so as to improve the detection accuracy of the content of sulfur-containing compounds in the natural gas.

Preferably, in this example, the boiling point column 40 is a squalane chromatographic column and has a length of 0.8 m; the sulfur column 41 is an oxydipropionitrile column and has a length of 1.7 m. In a specific embodiment, the basic parameters of the chromatographic column system 38 are shown in Table 1 below:

TABLE 1

Specification parameters of the chromatographic column system 38

| Component | Specification | Usage |
|---|---|---|
| Chromatographic column (sulfur column 41) | 1.7 m × 1/8 in | mainly used to analyze light sulfur components in natural gas, such as hydrogen sulfide, carbonyl sulfide, methyl mercaptan and ethyl mercaptan |
| Chromatographic column (boiling point column 40) | 0.8 m × 1/8 in | mainly used to analyze heavy sulfur components in natural gas, such as ethyl sulfide and n-butyl mercaptan |
| Carrier gas (nitrogen) | 0.24 MPa | used for carrying the material to be measured in the instrument at a flow rate of 22 ml/min |
| Quantization tube 54 | 0.25 ml | used for sample size verification |

The chromatographic column system is provided with a ten-way valve through which the communication between the components in the chromatographic column system is switchable and a quantization tube 54.

Figure 4A:
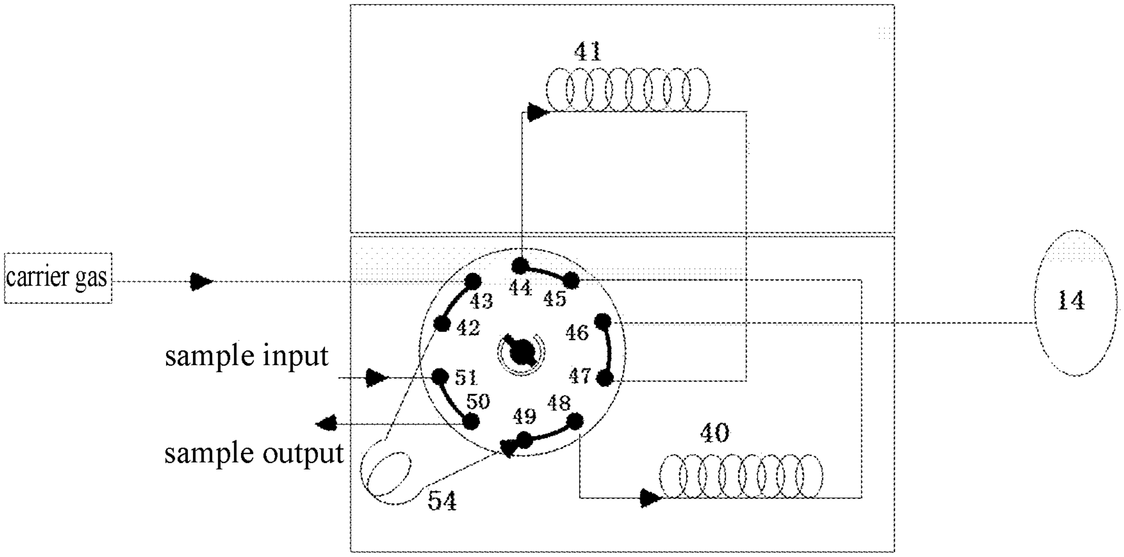
FIG. 4A is a schematic diagram of a ten-way valve connection structure according to an example of the present invention.
Figure 4B:
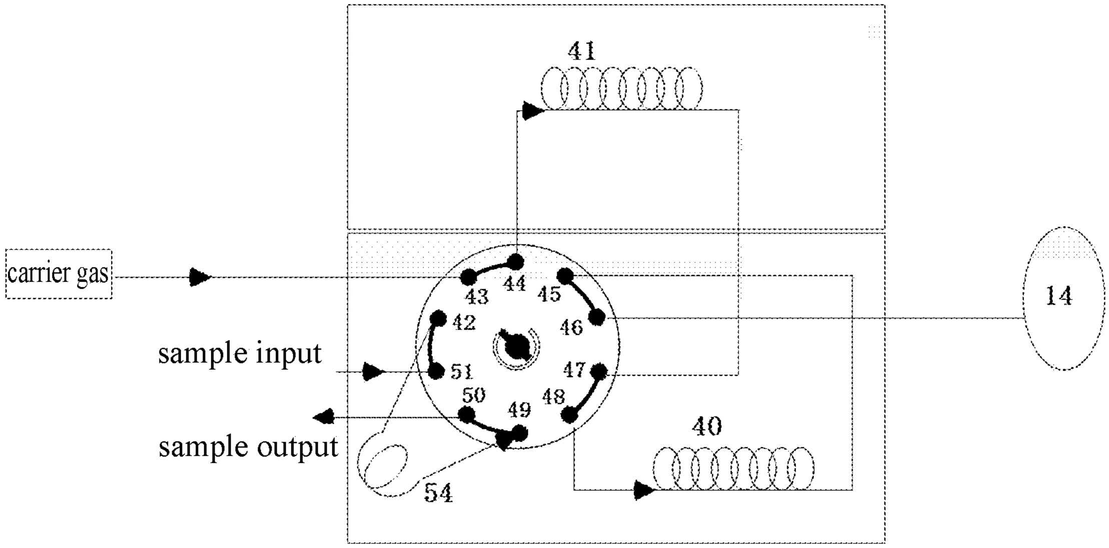
FIG. 4B is a schematic diagram of a ten-way valve connection structure according to an example of the present invention.
Figure 4C:
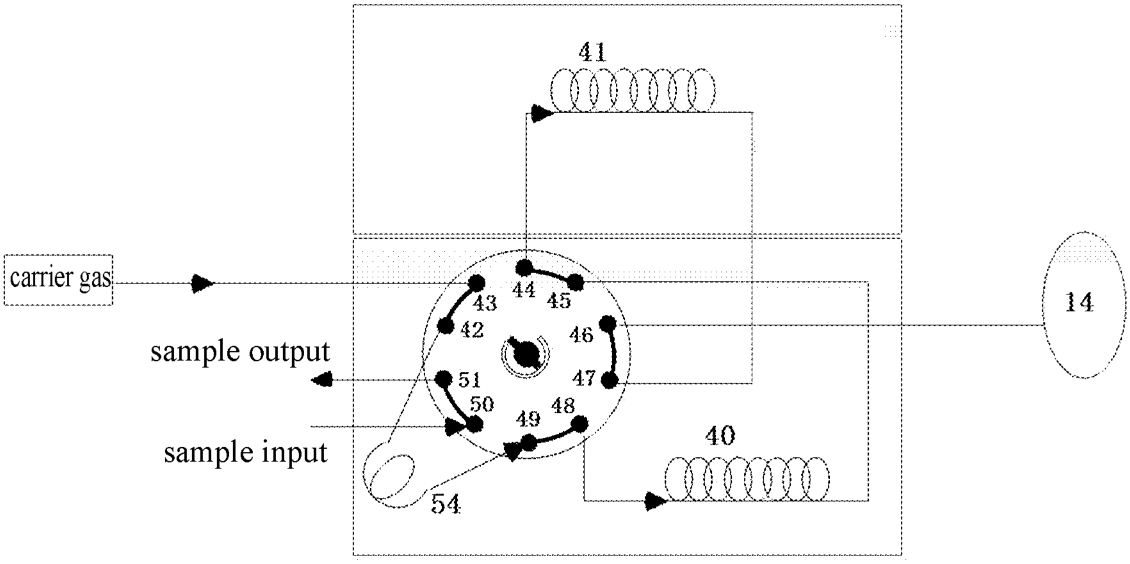
FIG. 4C is a schematic diagram of a ten-way valve connection structure according to an example of the present invention.
Figure 4D:
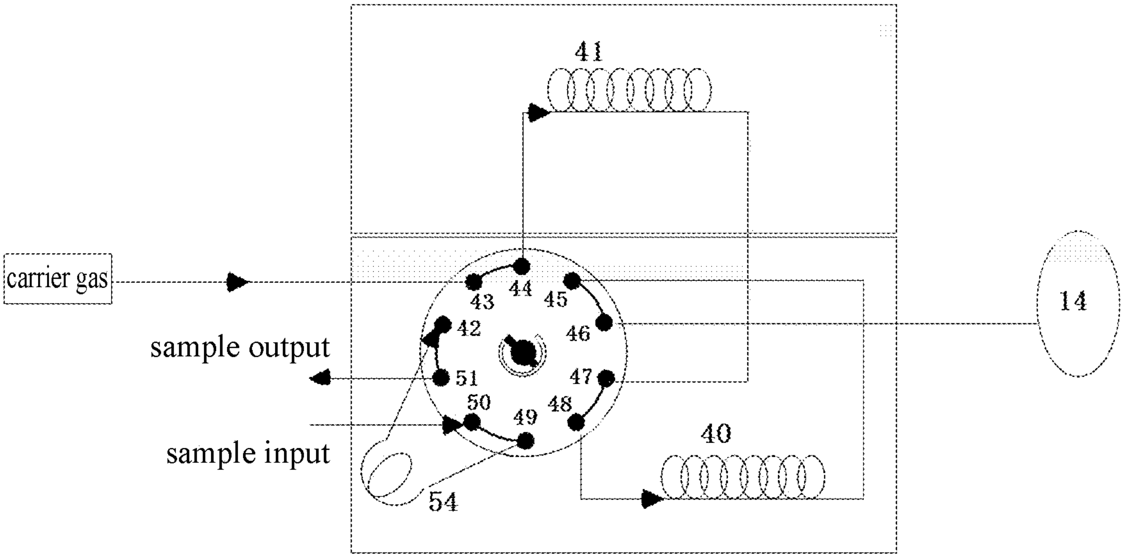
FIG. 4D is a schematic diagram of a ten-way valve connection structure according to an example of the present invention.
Figure 5A:
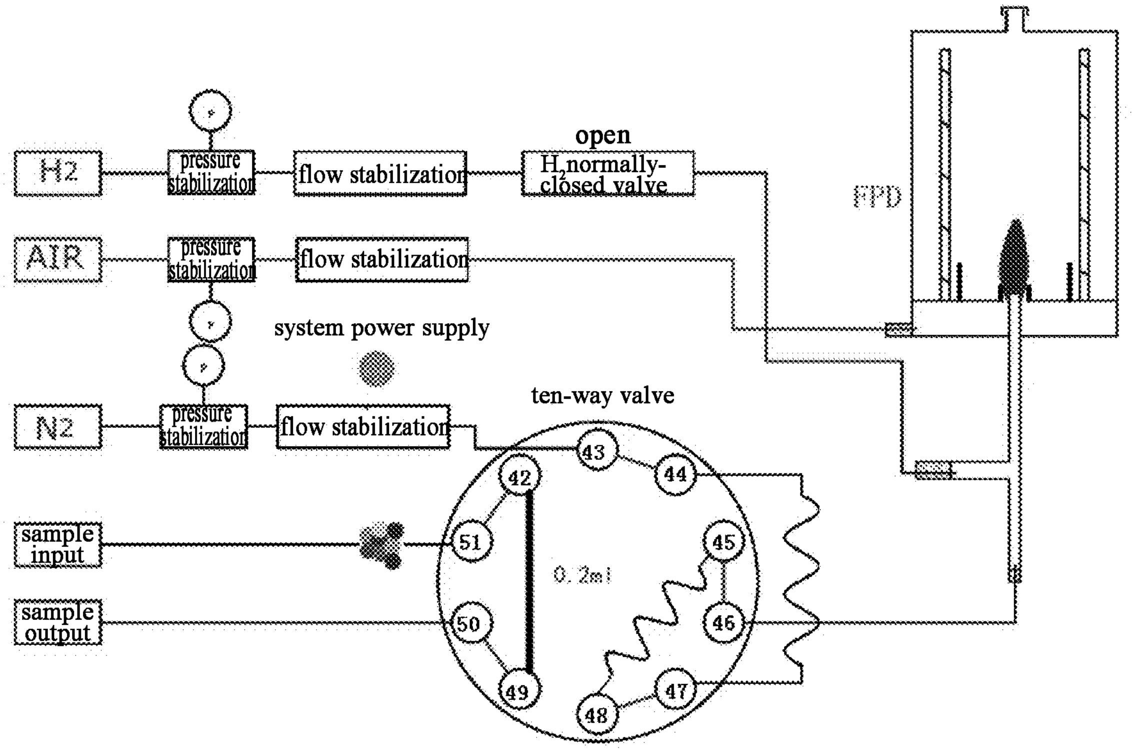
FIGS. 5A-5J are schematic diagrams of the workflow of a system for on-line flame photometric detection of the content of sulfur-containing compounds in natural gas according to an example of the present invention.
Figure 5B:
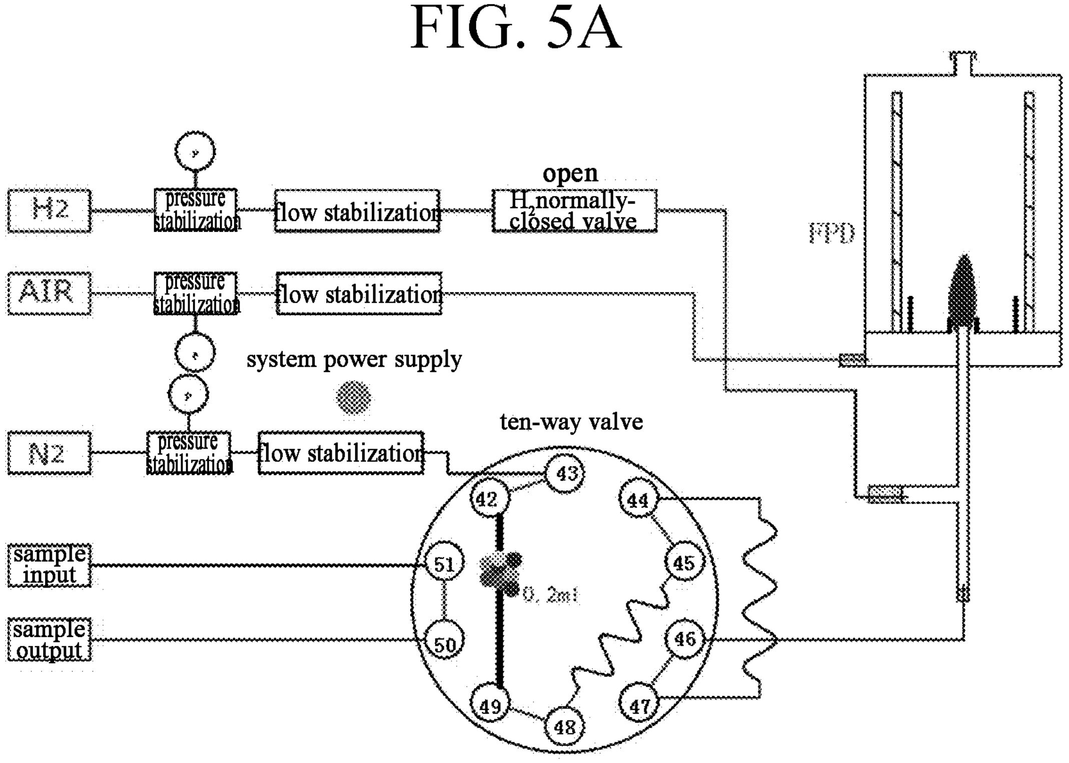
Figure 5C:
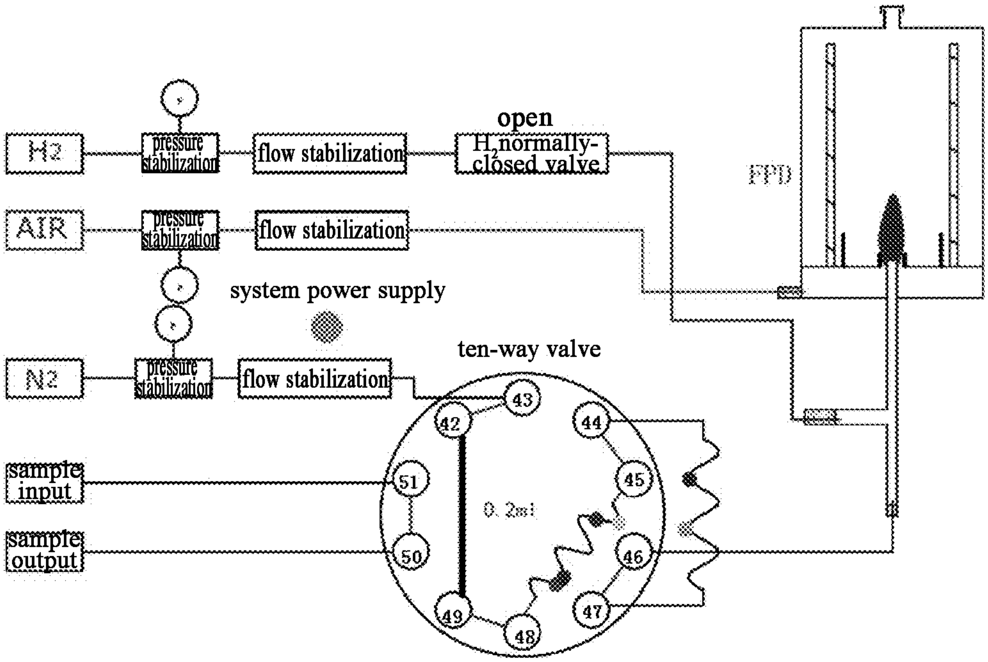
Figure 5D:
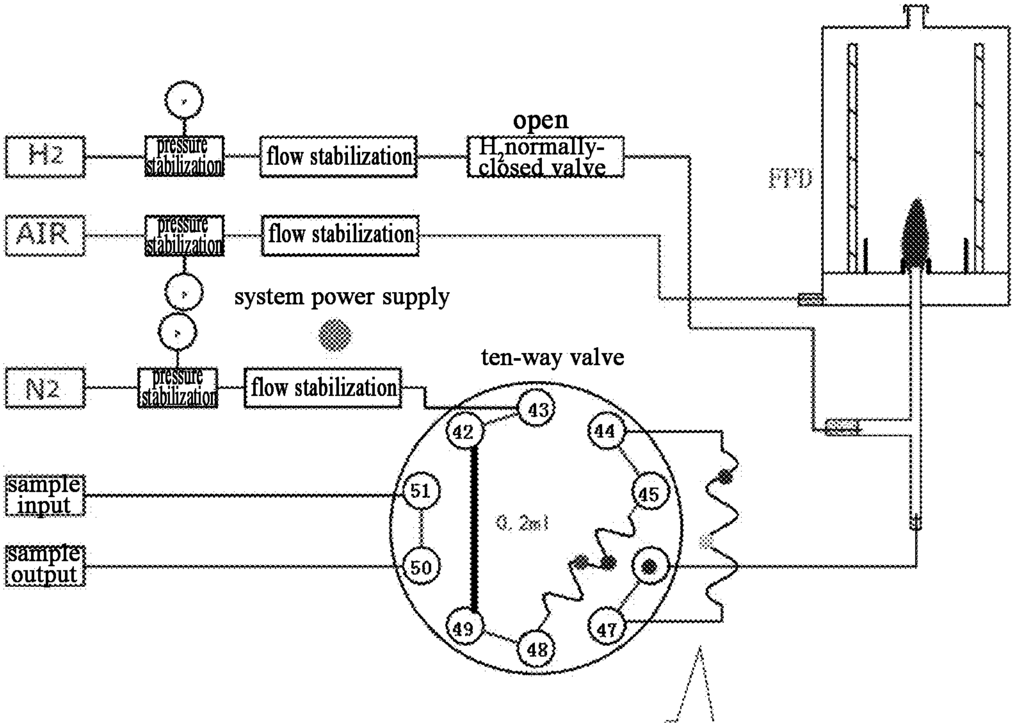
Figure 5E:
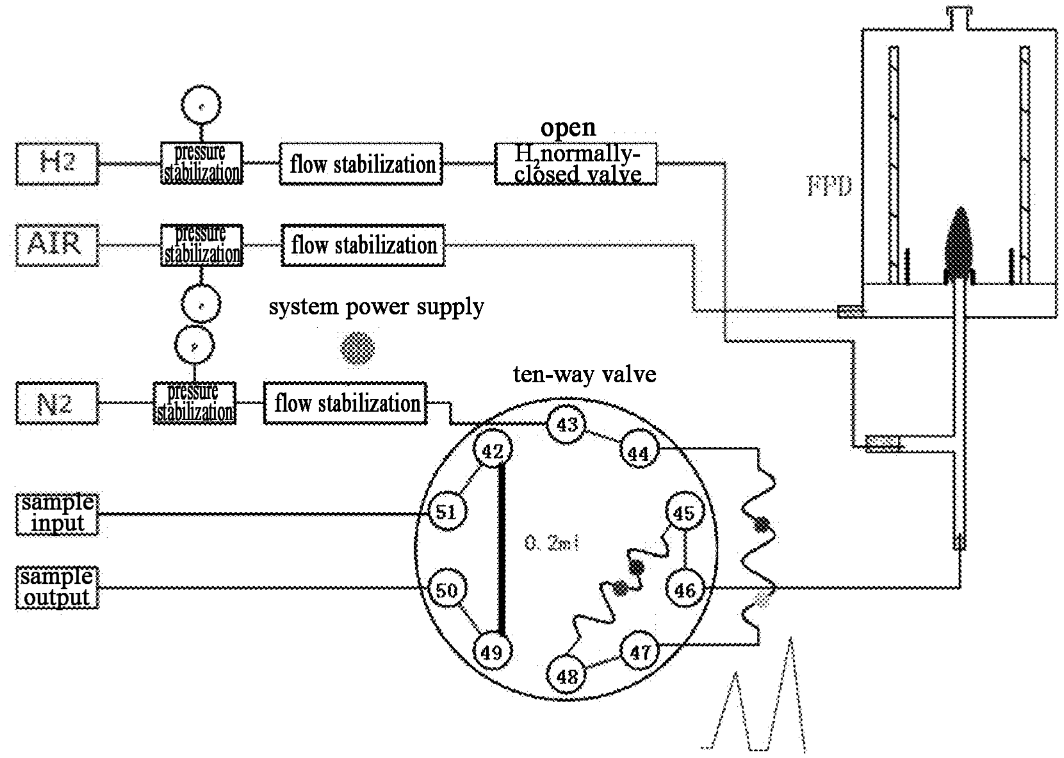
Figure 5F:
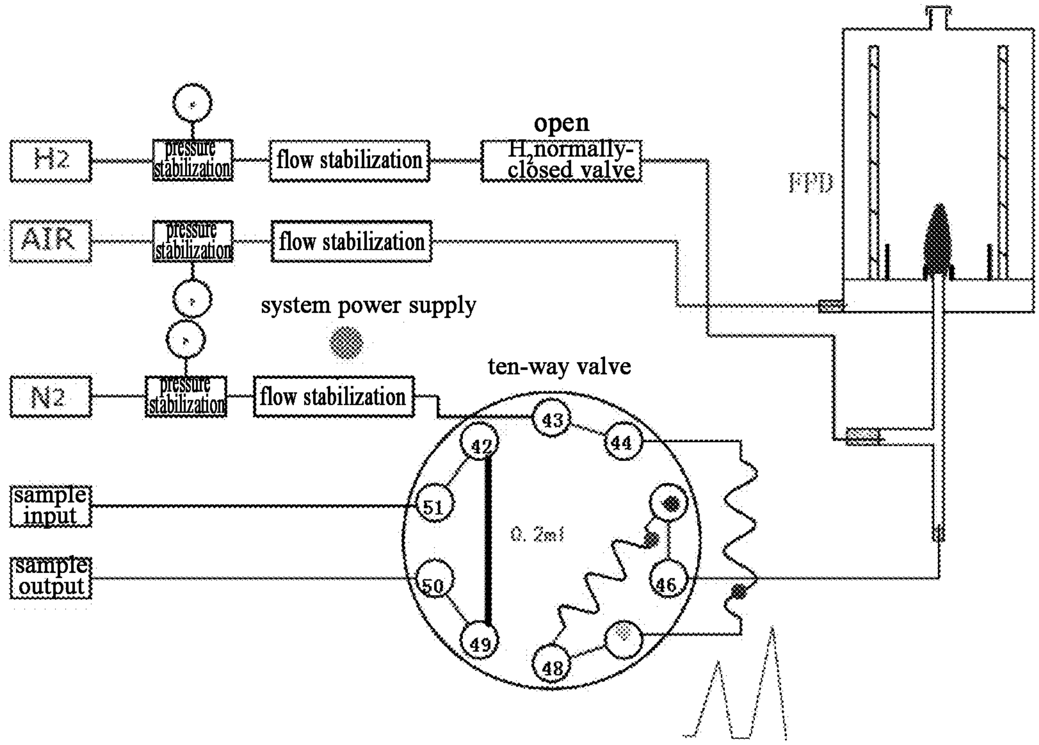
Figure 5G:
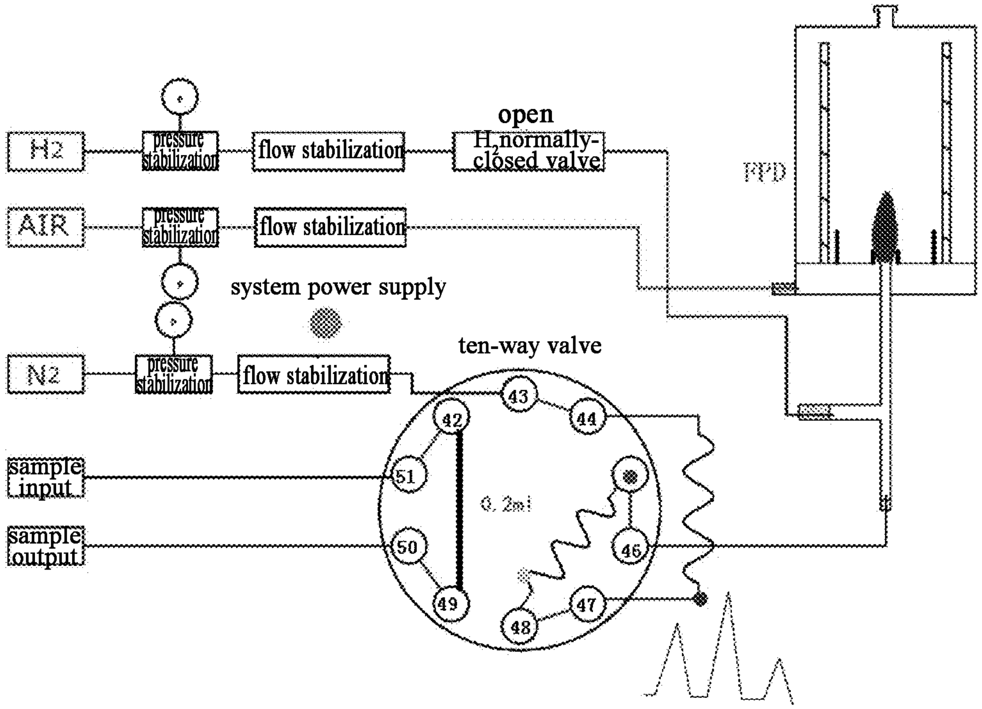
Figure 5H:
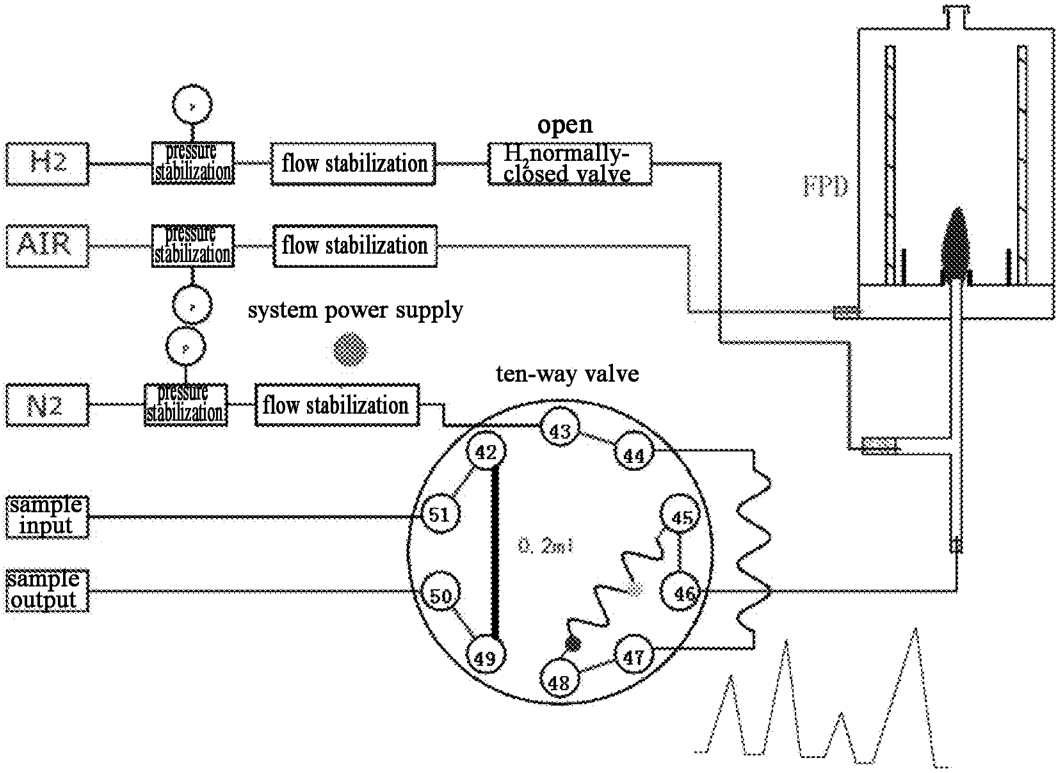
Figure 5I:
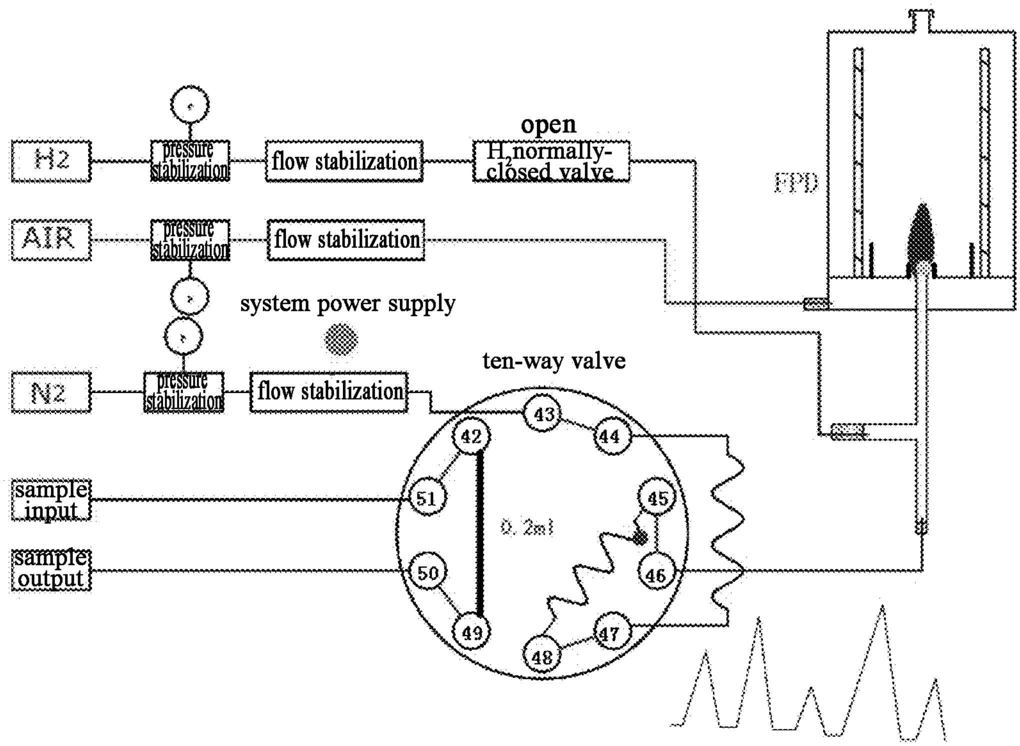
Figure 5J:
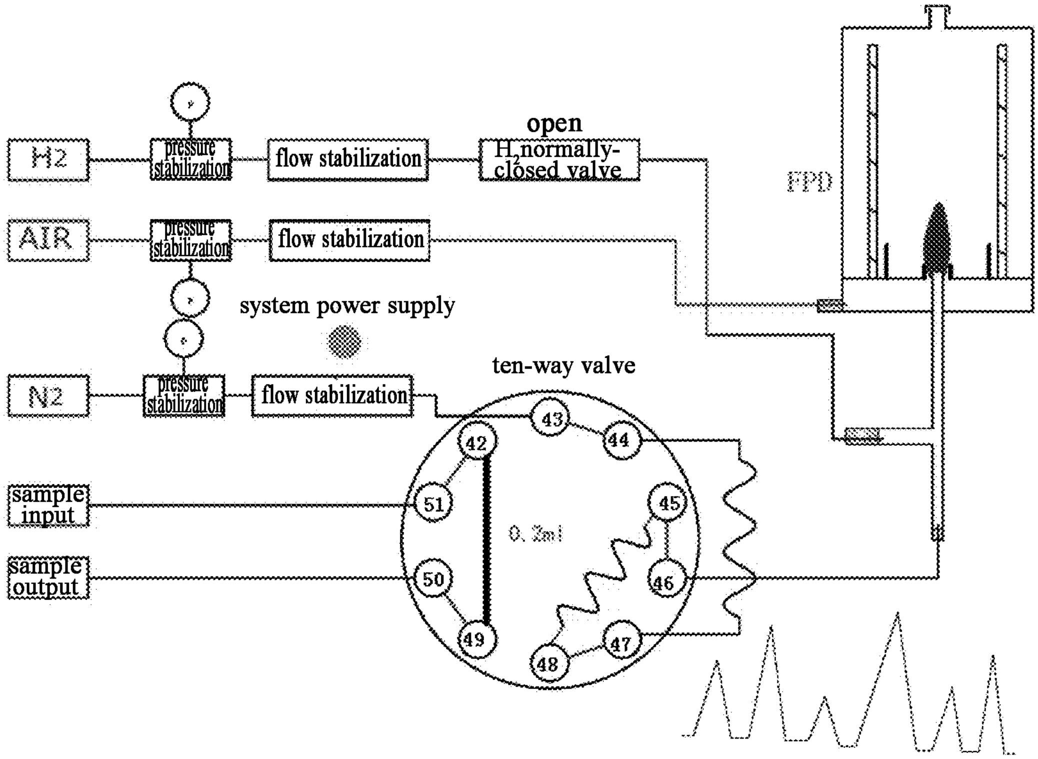
Figure 6A:
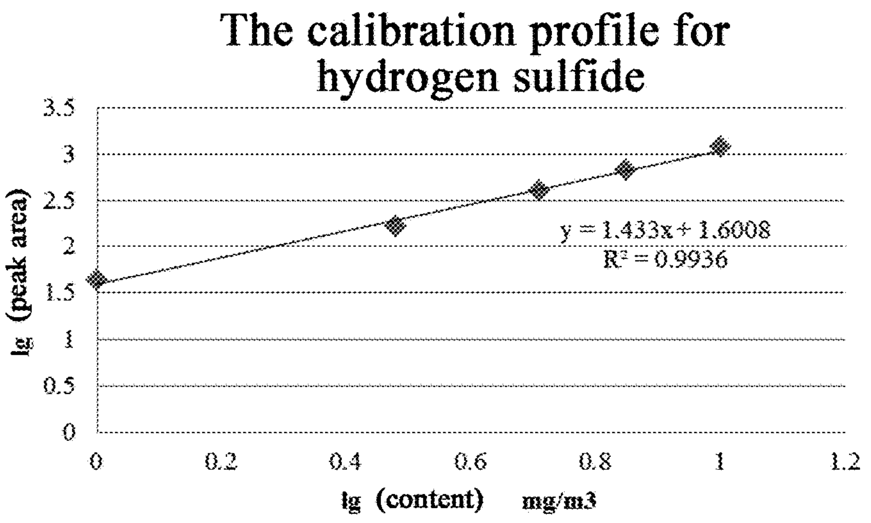
FIG. 6A is a standard curve of hydrogen sulfide according to an example of the present invention.
Figure 6B:
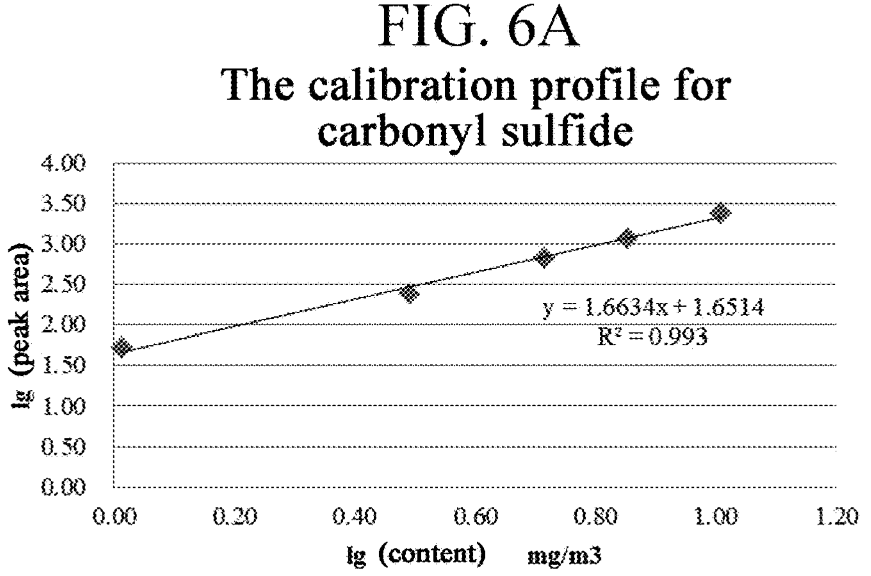
FIG. 6B is a standard curve of carbon oxysulfide according to an example of the present invention.
Figure 6C:
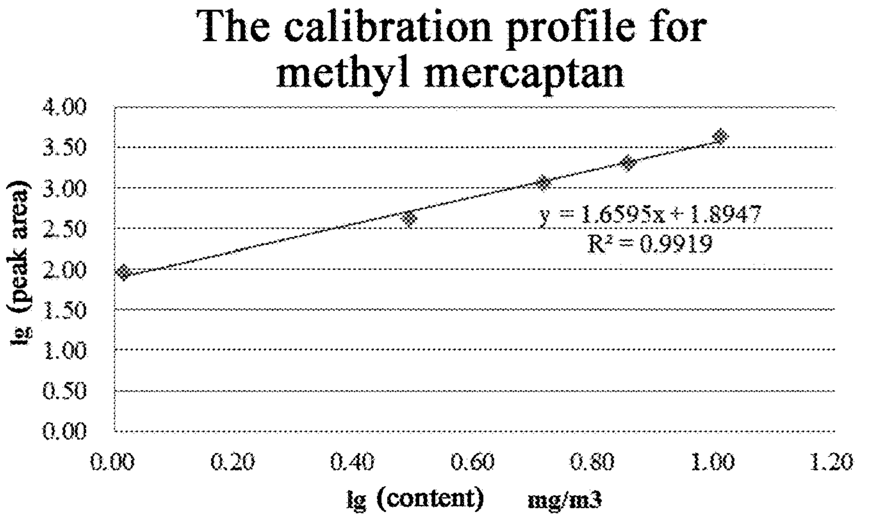
FIG. 6C is a standard curve of methyl mercaptan according to an example of the present invention.
Figure 6D:
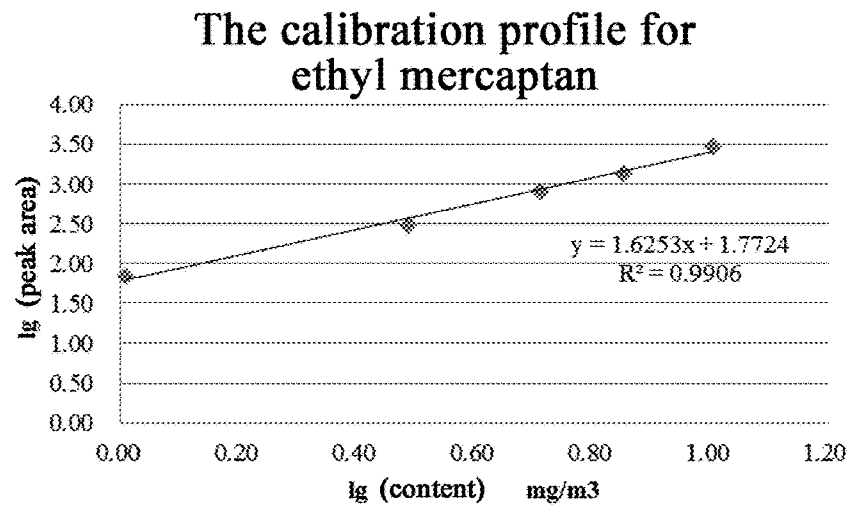
FIG. 6D is a standard curve of ethyl mercaptan according to an example of the present invention.
Figure 6E:
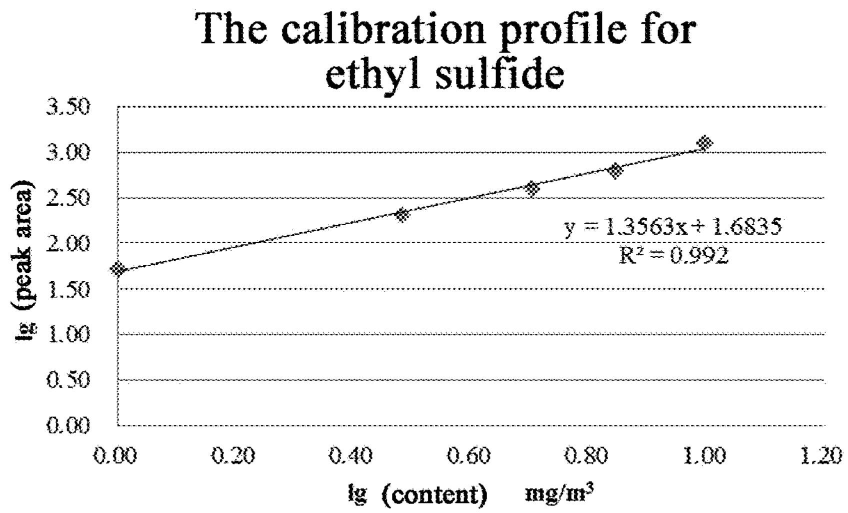
FIG. 6E is a standard curve of ethyl sulfide according to an example of the present invention.
Figure 6F:
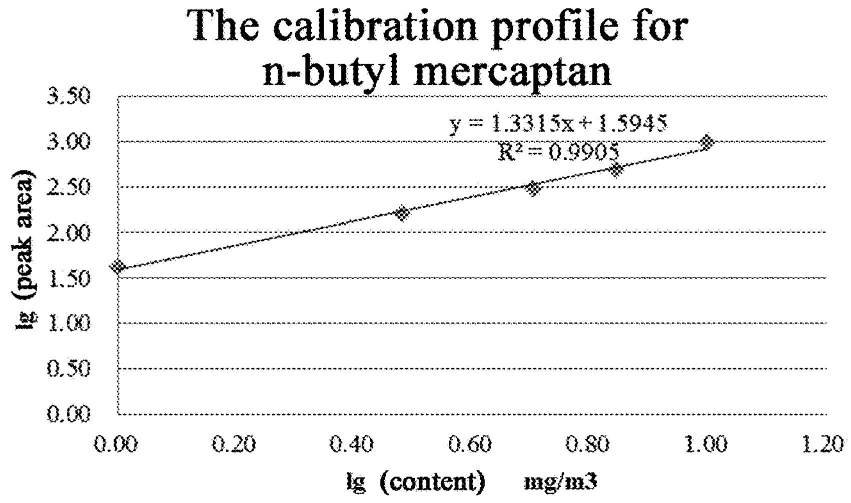
FIG. 6F is a standard curve of n-butyl mercaptan according to an example of the present invention.

As shown in FIGS. 4A, 4B, 4C and 4D, the ten-way valve is provided with a first valve port 42, a second valve port 43, a third valve port 44, a fourth valve port 45, a fifth valve port 46, a sixth valve port 47, a seventh valve port 48, an eighth valve port 49, a ninth valve port 50 and a tenth valve port 51 clockwise. The ten-way valve is an adjustable valve and can be tap controlled to realize the communication between the first valve port 42 and the second valve port 43, the communication between the third valve port 44 and the fourth valve port 45, the communication between the fifth valve port 46 and the sixth valve port 47, the communication between the seventh valve port 48 and the eighth valve port 49 and the communication between the ninth valve port 50 and the tenth valve port 51 in tap position A (as shown in FIGS. 4A and 4C), and the communication between the tenth valve 51 port and the first valve port 42, the communication between the second valve port 43 and the third valve port 44, the communication between the fourth valve port 45 and the fifth valve port 46, the communication between the sixth valve port 47 and the seventh valve port 48 and the communication between the eighth valve port 49 and the ninth valve port 50 in tap position B (as shown in FIGS. 4B and 4D).

One of the tenth valve port 51 and the ninth valve port 50 of the ten-way valve is in communication with the third delivery pipeline 13, and the natural gas to be analyzed enters through the tenth valve port 51 or ninth valve port 50 of the ten-way valve, while the other of the tenth valve port 51 and the ninth valve port 50 of the ten-way valve is used to vent excess gas. As shown in FIGS. 4A and 4B, the tenth valve port 51 of the ten-way valve is in communication with the third delivery pipeline 13, and the natural gas to be analyzed enters through the tenth valve port 51 of the ten-way valve, while the ninth valve port 50 of the ten-way valve is used to vent excess gas. As shown in FIGS. 4C and 4D, the ninth valve port 50 of the ten-way valve is in communication with the third delivery pipeline 13, and the natural gas to be analyzed enters through the ninth valve port 50 of the ten-way valve, while the tenth valve port 51 of the ten-way valve is used to vent excess gas.

A quantization tube 54 is provided between the first valve port 42 and the eighth valve port 49 of the ten-way valve for temporarily storing the natural gas to be analyzed, so as to enable quantification of the natural gas to be analyzed, and the first valve port 42 of the ten-way valve is in communication with the eighth valve port 49 of the ten-way valve through the quantization tube 54. A carrier gas input line is in communication with the second valve port 43 of the ten-way valve. The boiling point column 40 is provided between the fourth valve port 45 and the seventh valve port 48 of the ten-way valve, such that the fourth valve port 45 of the ten-way valve is in communication with the seventh valve port 48 of the ten-way valve through the boiling point column 40. The sulfur column is provided between the third valve port 44 and the sixth valve port 47 of the ten-way valve, such that the third valve port 44 of the ten-way valve is in communication with the sixth valve port 47 of the ten-way valve through the sulfur column. The fifth valve port 46 of the ten-way valve is in communication with the flame photometric detector 14.

Preferably, in this example, the system further comprises a standard gas substance storage bottle 15. A standard gas substance delivery pipe 16 is provided between the standard gas substance storage bottle 15 and the chromatographic column system 38. The standard gas substance delivery pipe 16 has one end in communication with the input port of the chromatographic column system 38, and the other end in communication with the output port of the standard gas substance storage bottle 15. The standard gas substance delivery pipe 16 is provided with a second valve through which the standard gas substance delivery pipe 16 is opened or closed. A standard gas substance can be delivered through the standard gas substance storage bottle 15 to facilitate the use of standard gas substances for calibration on a batch-by-batch or daily basis, which can further improve the detection accuracy of the sulfur-containing compounds in natural gas to be analyzed, wherein the standard gas substance storage bottle 15 may be a container with a sulfur inert inner coating.

Preferably, in this example, the system further comprises a display 39 which is fixedly connected to the flame photometry detector 14, wherein the display 39 is electrically connected to the flame photometry detector 14 and shows detection results of the flame photometry detector 14.

Preferably, in this example, the system further comprises an alarm linkage device 19 and a combustible gas detection alarm 18, both of which are electrically connected to the flame photometry detector 14; and the alarm linkage device 19 is electrically connected to the first valve 6. The combustible gas detection alarm 18 is used to detect whether combustible gas leakage occurs in the vicinity of the flame photometry detector 14 to avoid potential safety hazards; and the alarm linkage device 19 is a controller, and will close the first valve 6 in time such that the delivery of the gas to be detected will stop when the combustible gas detection alarm detects the leakage of combustible gas. This stops the delivery of natural gas to be detected, thus preventing further possible accidents.

Preferably, in this example, the flame photometric detector 14 is further provided with an exhaust pipe 17 on its side wall, through which the smoke after combustion is discharged at a long distance to avoid safety hazards.

Preferably, in this example, the system further comprises a power supply box 20 electrically connected to the first valve 6, the flame photometric detector 14, the chromatographic column system 38 and the display 39 for supplying power.

This example further provides a method for on-line flame photometric detection of the content of sulfur-containing compounds in natural gas, comprises the steps of:

S1: A calibration curve profile was obtained, including:

S101: The standard gas substance was formulated by mixing each of six sulfur-containing compounds, in particular, hydrogen sulfide, carbonyl sulfide, methyl mercaptan, ethyl mercaptan, ethyl sulfide and n-butyl mercaptan stored in the standard gas substance storage bottle with methane, wherein 5 groups of standard gas substances with different concentrations of sulfur-containing compounds, labeled as 1 #, 2 #, 3 #, 4 # and 5 #, were prepared. The concentrations of sulfur-containing compounds in these groups of standard gas substances are shown in Tables 2-7.

S102: The content of sulfur-containing compounds in the standard gas substance (i.e., the natural gas standard sample) was detected by passing the standard gas substance obtained in step S101 through the chromatographic column system 38 and the flame photometric detector 14, to obtain the natural gas standard sample profile (which can be performed in the same manner as in step 3 below).

S103: A natural gas standard sample profile was obtained based on the display 39 and a response value of the FPD was derived from the profile, to obtain the corresponding response peak area value data. A standard curve of the content of each sulfur-containing compound was plotted with the concentration of each sulfur-containing compound as a vertical coordinate and the corresponding response peak area value of each sulfur-containing compound as a horizontal coordinate. The results are shown in FIGS. 6A-6F.

Concentrations and corresponding response peak area values for each specific standard are shown in Tables 2-7 below.

TABLE 2

Concentration and corresponding response peak area values for hydrogen sulfide

| No. | hydrogen sulfide concentration, mg/m$^3$ | response peak area | lg (hydrogen sulfide concentration) | lg (response peak area) |
|---|---|---|---|---|
| 1# | 1 | 43.67 | 0 | 1.64 |
| 2# | 3.01 | 137.68 | 0.48 | 2.22 |
| 3# | 5.12 | 397.18 | 0.71 | 2.6 |
| 4# | 7.05 | 665.90 | 0.85 | 2.83 |
| 5# | 10.1 | 1183.69 | 1 | 3.07 |

TABLE 3

Concentration and corresponding response peak area values for carbonyl sulfide

| No. | carbonyl sulfide concentration, mg/m$^3$ | response peak area | lg (carbonyl sulfide concentration) | lg (response peak area) |
|---|---|---|---|---|
| 1# | 1.03 | 52.37 | 0.01 | 1.72 |
| 2# | 3.1 | 244.64 | 0.49 | 2.39 |
| 3# | 5.18 | 672.53 | 0.71 | 2.83 |
| 4# | 7.15 | 1160.76 | 0.85 | 3.06 |
| 5# | 10.2 | 2412.73 | 1.01 | 3.38 |

TABLE 4

Concentration and corresponding response peak area values for ethyl sulfide

| No. | ethyl sulfide concentration, mg/m$^3$ | response peak area | lg (ethyl sulfide concentration) | lg (response peak area) |
|---|---|---|---|---|
| 1# | 1 | 52.03 | 0.00 | 1.72 |
| 2# | 3.03 | 201.50 | 0.48 | 2.30 |
| 3# | 5.06 | 395.92 | 0.70 | 2.60 |
| 4# | 6.99 | 634.61 | 0.84 | 2.80 |
| 5# | 9.93 | 1266.15 | 1.00 | 3.10 |

TABLE 5

Concentration and corresponding response peak area values for n-butyl mercaptan

| No. | n-butyl mercaptan concentration, mg/m$^3$ | response peak area | lg (n-butyl mercaptan concentration) | lg (response peak area) |
|---|---|---|---|---|
| 1# | 1 | 42.38 | 0.00 | 1.63 |
| 2# | 3.03 | 161.74 | 0.48 | 2.21 |
| 3# | 5.07 | 305.42 | 0.71 | 2.48 |
| 4# | 7 | 489.64 | 0.85 | 2.69 |
| 5# | 9.94 | 988.78 | 1.00 | 3.00 |

TABLE 6

Concentration and corresponding response peak area values for methyl mercaptan

| No. | methyl mercaptan concentration, mg/m$^3$ | response peak area | lg (methyl mercaptan concentration) | lg (response peak area) |
|---|---|---|---|---|
| 1# | 1.03 | 92.38 | 0.01 | 1.97 |
| 2# | 3.1 | 426.75 | 0.49 | 2.63 |
| 3# | 5.18 | 1148.27 | 0.71 | 3.06 |
| 4# | 7.15 | 1989.57 | 0.85 | 3.30 |
| 5# | 10.2 | 4290.61 | 1.01 | 3.63 |

TABLE 7

Concentration and corresponding response peak area values for ethyl mercaptan

| No. | ethyl mercaptan concentration, mg/m$^3$ | response peak area | lg (ethyl mercaptan concentration) | lg (response peak area) |
|---|---|---|---|---|
| 1# | 1.02 | 68.93 | 0.01 | 1.84 |
| 2# | 3.08 | 304.92 | 0.49 | 2.48 |
| 3# | 5.16 | 806.23 | 0.71 | 2.91 |
| 4# | 7.12 | 1389.52 | 0.85 | 3.14 |
| 5# | 10.1 | 2980.90 | 1.00 | 3.47 |

S2: A sampling probe is used to obtain the natural gas delivered in the natural gas pipeline 1. After being filtered out of particulate impurities by a filter mesh, the natural gas is transported to the primary depressurizing component 8 through the first delivery pipeline 5, whereby the pressure of the natural gas is reduced to 2 MPa under the dual pressure reduction effect of the first heating membrane depressurizer 23 and the second heating membrane depressurizer 28 in the primary depressurizing component 8. Subsequently, it is transported via the second delivery pipeline 9 to the secondary depressurizing component 10, whereby the pressure of the natural gas is reduced to 0.2 MPa by the knob-type depressurizer 34 in the secondary depressurizing component 10, to obtain a depressurized natural gas.

S3: The depressurized natural gas obtained in step S2 is delivered to the chromatographic column system 38 through the third delivery pipeline 13 (the temperature at which the depressurized natural gas enters the chromatographic column system 38 is controlled to be 45° C.). The depressurized natural gas is separated in the chromatographic column system 38 driven by nitrogen at a pressure of 0.24 MPa and a flow rate of 22 ml/min. The separated material is delivered to the flame photometric detector 14 for combustion detection, to obtain a detection profile (see FIGS. 5A-5J).

S301: The depressurized natural gas is delivered to the chromatographic column system 38 through the third delivery pipeline 13, at which time the ten-way valve is in tap position B (as shown in FIGS. 4B and 4D), wherein the tenth valve port 51 is in communication with the first valve port 42, the second valve port 43 is in communication with the third valve port 44, the fourth valve port 45 is in communication with the fifth valve port 46, the sixth valve port 47 is in communication with the seventh valve port 48, and the eighth valve port 48 is in communication with the ninth valve port 49.

As shown in FIG. 4B, the depressurized natural gas enters from the tenth valve port 51, flows to the first valve port 42 and then enters the quantization tube for temporarily storage, and the excess depressurized natural gas is discharged via the ninth valve port 50; alternatively, as shown in FIG. 4D, the depressurized natural gas enters from the ninth valve port 50, flows to the eighth valve port 48 and then enters the quantization tube for temporarily storage, and the excess depressurized natural gas is discharged via the tenth valve port 51.

S302: The ten-way valve is switched to tap position A (as shown in FIGS. 4A and 4C), wherein the first valve port 42 is in communication with second valve port 43, the third valve port 44 is in communication with the fourth valve port 45, the fifth valve port 46 is in communication with the sixth valve port 47, the seventh valve port 48 is in communication with the eighth valve port 49, and the ninth valve port 50 is in communication with the tenth valve port 51.

Nitrogen gas with a pressure of 0.24 MPa and a flow rate of 22 ml/min is injected into the second valve port 43, and enters into the quantization tube through the first valve port 42 in order to drive the flow of the depressurized natural gas temporarily stored in the quantization tube. The gas is caused to enter the boiling point column 40 after passing through the eighth valve port 49 and the seventh valve port 48 in sequence, and is separated in the boiling point column 40 at a temperature of 70° C. Due to the different boiling points, a difference in the flow rates is formed for the various sulfur-containing compounds. The different sulfur-containing compounds sequentially enter the fourth valve port 45 under the action of nitrogen as a carrier gas, and enter the sulfur column 41 at a temperature of 68° C. through the third valve port 44, where they are separated again. The components of hydrogen sulfide and carbonyl sulfur of the sulfur-containing compounds sequentially leave the sulfur column, and enter the flame photometric detector 14 for combustion detection through the sixth valve port 47 and the fifth valve port 46 in sequence, to obtain a profile; wherein the temperature at which the natural gas enters the chromatographic column system 38 is controlled to be 45° C.

S303: Upon the component of carbonyl sulfide in the natural gas leaves the sulfur column, the ten-way valve is switched to the tap position B (as shown in FIGS. 4B and 4D), wherein the tenth valve port 51 is in communication with the first valve port 42, the second valve port 43 is in communication with the third valve port 44, the fourth valve port 45 is in communication with the fifth valve port 46, the sixth valve port 47 is in communication with the seventh valve port 48, and the eighth valve port 48 is in communication with the ninth valve port 49.

Nitrogen gas with a pressure of 0.24 MPa and a flow rate of 22 ml/min is injected into the second valve port 43, and enters into the sulfur column 41 through the third valve port 44 in order to drive the continued separation of the residual components of the natural gas in the sulfur column 41. At the same time, the residual components of ethyl mercaptan and n-butyl mercaptan in the boiling point column 40 continue to be separated and leave the boiling point column 40 in sequence. The components of methyl mercaptan and ethyl mercaptan in the sulfur-containing compounds sequentially leave the sulfur column 41 and re-enter the boiling point column 40 for separation. Eventually ethyl mercaptan, n-butyl mercaptan, methyl mercaptan, and ethyl mercaptan sequentially leave the boiling point column 40 in that order. The components leaving the boiling point column 40 enter the flame photometric detector 14 for combustion detection through the fourth valve port 45 and the fifth valve port 46 in sequence, to obtain a profile.

The combustion detection is carried out by using the flame photometric detector 14 in the following manner: introducing hydrogen at a pressure of 0.24 MPa and a flow rate of 40 ml/min and air at a pressure of 0.24 MPa and a flow rate of 80 ml/min, and performing combustion detection by the flame photometric detector 14 at 150° C., to obtain the detection profile; wherein hydrogen serves as a fuel gas, and the air serves as a combustion-supporting gas.

S4: The response peak area values are obtained from the detection profiles obtained in step S3 and introduced to the standard curve of content of sulfur-containing compounds obtained from step S1. The content of sulfur-containing compounds is thus obtained by reading from the profile, wherein the total sulfur content of natural gas is the sum of the concentrations of the various sulfur-containing compounds.

The online detection method has a reasonable error value range of ≤5%. This indicates that the system for on-line flame photometric detection of the content of sulfur-containing compounds in natural gas of the present invention can achieve effective on-line detection of the content of sulfur-containing compounds in natural gas with higher detection accuracy.

In the present invention, specific examples are used to illustrate the principles and implementations of the present invention. The above examples are only used to help understand the method and the core idea of the present invention. At the same time, for the general technical personnel in the field, according to the concept of the present invention, there may be changes in the specific implementation and application scope. In summary, the detailed description of this specification should not be construed as a limitation of the present invention.

DESCRIPTION FOR THE NUMERICAL REFERENCES

1: natural gas pipeline; 2: detection port; 3: mounting base; 4: sampling probe; 5: first delivery pipeline; 6: first valve; 7: circulating tracer tube; 8: primary depressurizing component; 9: second delivery pipeline; 10: secondary depressurizing component; 11: primary heating tube; 12: secondary heating tube; 13: third delivery pipeline; 14: flame photometric detector; 15: standard gas substance storage bottle; 16: standard gas substance delivery pipe; 17: exhaust pipe; 18: combustible gas detection alarm; 19: alarm linkage device; 20: power supply box; 21: primary depressurizing tank; 22: primary thermal insulation layer; 23: first heating membrane depressurizer; 24: first hot gas pipe; 25: second hot gas pipe; 26: first pressure gauge; 27: first connecting pipe; 28: second heating membrane depressurizer; 29: second pressure gauge; 30: secondary depressurizing tank; 31: secondary thermal insulation layer; 32: third hot gas pipe; 33: alarm; 34: knob-type depressurizer; 35: second connecting pipe; 36: third pressure gauge; 38: chromatographic column system; 39: display; 40: boiling point column; 41: sulfur column; 42: first valve port; 43: second valve port; 44: third valve port; 45: fourth valve port; 46: fifth valve port; 47: sixth valve port; 48: seventh valve port; 49: eighth valve port; 50: ninth valve port; 51: tenth valve port; 52: primary discharge pipe; 53: secondary discharge pipe; 54: quantization tube.

What is claimed is:

1. A system for on-line flame photometric detection of the content of sulfur-containing compounds in natural gas, comprising:

a) a sampling device;

b) a depressurization system;

c) a chromatographic column system; and d) a flame photometric detector;

wherein the chromatographic column system includes a carrier gas input line, a boiling point column, and a sulfur column;

wherein an output port of the sampling device is in communication with an input port of the depressurization system through a first delivery pipeline;

wherein an output port of the depressurization system is in communication with an input port of the boiling point column through a switchable connecting passage;

wherein the input port of the boiling point column and an input port of the sulfur column are each connected to the carrier gas input line through a switchable connecting passage;

wherein an output port of the boiling point column is in communication with the input port of the sulfur column through a switchable connecting passage;

wherein an output port of the sulfur column is in communication with the input port of the boiling point column through a switchable connecting passage; and wherein the output port of the boiling point column and the output port of the sulfur column are each connected to an input port of the flame photometric detector through a switchable connecting passage.

2. The system according to claim 1, wherein the sampling device comprises a mounting base and a sampling probe fixedly connected to the mounting base and in communication with the first delivery pipeline; and wherein the sampling probe is mounted to a natural gas pipeline through the mounting base to enable the sampling device to be fixed to the natural gas pipeline, thereby realizing on-line acquisition of natural gas in the natural gas pipeline by means of the sampling probe placed inside the natural gas pipeline.

3. The system according to claim 1, wherein the first delivery pipeline is provided with a first valve by which the first delivery pipeline is opened or closed.

4. The system according to claim 1, wherein the depressurization system comprises a primary depressurizing component and a secondary depressurizing component connected in sequence;

wherein an input port of the secondary depressurizing component is in communication with an output port of the primary depressurizing component through a second delivery pipeline;

wherein an input port of the primary depressurizing component, as an input port of the depressurization system, is in communication with an output port of the sampling device through the first delivery pipeline; and wherein an output port of the secondary depressurizing component, as an output port of the depressurization system, is in communication with the input port of the boiling point column through a switchable connecting passage.

5. The system according to claim 4, wherein the primary depressurizing component comprises a primary depressurizing tank, a first heating membrane depressurizer, a second heating membrane depressurizer, a first pressure gauge, and a second pressure gauge, wherein the first heating membrane depressurizer, the second heating membrane depressurizer, the first pressure gauge, and the second pressure gauge are each placed inside the primary depressurizing tank;

wherein a first connecting pipe is provided between the first heating membrane depressurizer and the second heating membrane depressurizer, the first connecting pipe has one end in communication with an output port of the first heating membrane depressurizer and the other end in communication with an input port of the second heating membrane depressurizer;

wherein the first pressure gauge is mounted on the first connecting pipe and is in communication with the first connecting pipe;

wherein the other end of the first delivery pipeline passes into the primary depressurizing tank and is in communication with an input port of the first heating membrane depressurizer;

wherein one end of the second delivery pipeline passes into the primary depressurizing tank and is in communication with an output port of the second heating membrane depressurizer; and wherein the second pressure gauge is mounted on the second delivery pipeline and is in communication with the second delivery pipeline.

6. The system according to claim 4, wherein the secondary depressurizing component comprises a secondary depressurizing tank, a knob-type depressurizer, a second connecting pipe, and a third pressure gauge, wherein the knob-type depressurizer, the second connecting pipe, and the third pressure gauge are each placed inside the secondary depressurizing tank;

wherein one end of the second delivery pipeline passes into the secondary depressurizing tank and is in communication with an input port of the knob-type depressurizer;

wherein the second connecting pipe has one end in communication with an output port of the knob-type depressurizer and the other end in communication with one end of the third pressure gauge; and wherein the other end of the third pressure gauge, as an output port of the secondary depressurizing component, is in communication with the input port of the boiling point column through a switchable connecting passage.

7. The system according to claim 1, further comprising a circulating tracer tube;

wherein the depressurization system is further provided with a tracer component; and wherein the circulating tracer tube is in communication with the tracer component of the depressurization system, so as to heat the natural gas to be analyzed in the depressurization system.

8. The system according to claim 1, wherein the chromatographic column system is provided with a quantization tube for temporarily storing the natural gas to be analyzed, which enters the chromatographic column system, to enable quantification of the natural gas to be analyzed for separation of sulfur-containing compounds using the chromatographic column system.

9. The system according to claim 8, wherein the chromatographic column system is provided with a ten-way valve through which the communication between components in the chromatographic column system is switchable.

10. The system according to claim 9, wherein the ten-way valve is provided with a first valve port, a second valve port, a third valve port, a fourth valve port, a fifth valve port, a sixth valve port, a seventh valve port, an eighth valve port, a ninth valve port, and a tenth valve port clockwise;

wherein the ten-way valve is an adjustable valve, and can be tap controlled to realize communication between the first valve port and the second valve port, communication between the third valve port and the fourth valve port, communication between the fifth valve port and the sixth valve port, communication between the seventh valve port and the eighth valve port, and communication between the ninth valve port and the tenth valve port in one tap position, and communication between the tenth valve port and the first valve port, communication between the second valve port and the third valve port, communication between the fourth valve port and the fifth valve port, communication between the sixth valve port and the seventh valve port, and communication between the eighth valve port and the ninth valve port in another tap position;

wherein one of the tenth valve port and the ninth valve port of the ten-way valve is in communication with the output port of the depressurization system through a third delivery pipeline, and the other of them is used to vent excess gas;

wherein a quantization tube is provided between the first valve port and the eighth valve port of the ten-way valve for temporarily storing the natural gas to be analyzed, to enable quantification of the natural gas to be analyzed, and the first valve port of the ten-way valve is in communication with the eighth valve port of the ten-way valve through the quantization tube;

wherein the carrier gas input line is in communication with the second valve port of the ten-way valve;

wherein the boiling point column is provided between the fourth valve port and the seventh valve port of the ten-way valve, such that the fourth valve port of the ten-way valve is in communication with the seventh valve port of the ten-way valve through the boiling point column;

wherein the sulfur column is provided between the third valve port and the sixth valve port of the ten-way valve, such that the third valve port of the ten-way valve is in communication with the sixth valve port of the ten-way valve through the sulfur column; and wherein the fifth valve port of the ten-way valve is in communication with the flame photometric detector.

11. The system according to claim 1, wherein the boiling point column is a squalane column.

12. The system according to claim 11, wherein the boiling point column has a length of not less than 0.8 m.

13. The system according to claim 1, wherein the sulfur column is an oxydipropionitrile column.

14. The system according to claim 13, wherein the sulfur column has a length of not less than 1.7 m.

15. The system according to claim 1, further comprising an alarm linkage device and a combustible gas detection alarm, both of which are electrically connected to the flame photometry detector;

wherein the combustible gas detection alarm is used to detect whether combustible gas leakage occurs in a vicinity of the flame photometry detector; and wherein the alarm linkage device is a controller and will close the first delivery pipeline in time such that the delivery of the gas to be detected will stop when the combustible gas detection alarm detects the leakage of combustible gas.

16. The system according to claim 1, further comprising a standard gas substance storage bottle, wherein a standard gas substance delivery pipe is provided between the standard gas substance storage bottle and the chromatographic column system;

wherein the standard gas substance delivery pipe has one end in communication with an input port of the chromatographic column system, and the other end in communication with an output port of the standard gas substance storage bottle; and wherein the standard gas substance delivery pipe is provided with a second valve through which the standard gas substance delivery pipe is opened or closed.

17. A method for on-line flame photometric detection of the content of sulfur-containing compounds in natural gas using the system for on-line flame photometric detection of the content of sulfur-containing compounds in natural gas according to claim 1, comprising the steps of:

S1: obtaining a standard gas substance of sulfur-containing compounds and detecting the standard gas substance of sulfur-containing compounds for the content of sulfur-containing compounds to obtain the standard curve of the content of sulfur-containing compounds;

S2: obtaining the natural gas delivered in a natural gas pipeline using the sampling device, and delivering the natural gas to the depressurization system for depressurization to obtain the depressurized natural gas;

S3: delivering the depressurized natural gas obtained from step S2 to the chromatographic column system, separating the depressurized natural gas driven by a carrier gas using the boiling point column and the sulfur column in turn, and delivering the separated components to the flame photometric detector for combustion detection by the flame photometric detector to obtain a detection profile;

S4: switching the carrier gas to the input port of the sulfur column when the carbonyl sulfide component in the natural gas leaves the sulfur column in step S2, wherein the output port of the sulfur column is in communication with the input port of the boiling point column, and the output port of the boiling point column is in communication with the input port of the flame photometric detector; continually separating the remaining components using the chromatographic column system driven by the carrier gas, and delivering the separated components obtained at the output port of the boiling point column to the flame photometric detector for combustion detection by the flame photometric detector to obtain a detection profile; and S5: deriving the content of sulfur-containing compounds in the natural gas from the response peak area values obtained from the detection profiles obtained in steps S3 and S4 and the standard curve of content of sulfur-containing compounds obtained from step S1.

18. The method according to claim 17, wherein the sulfur column, when used for separation, has an operating temperature of 55-65° C.

19. The method according to claim 17, wherein the boiling point column, when used for separation, has an operating temperature of 65-75° C.

20. The method according to claim 17, wherein the obtaining the standard gas substance of sulfur-containing compounds and detecting the standard gas substance of sulfur-containing compounds for the content of sulfur-containing compounds to obtain the standard curve of the content of sulfur-containing compounds comprises the steps of:

S11: preparing the standard gas substance from methane together with hydrogen sulfide, carbonyl sulfide, methyl mercaptan, ethyl mercaptan, ethyl sulfide and n-butyl mercaptan, wherein at least 4 groups of standard gas substances with different concentrations of sulfur-containing compounds are prepared; and

S12: detecting each of the standard gas substances obtained from step S11 to obtain the corresponding response peak area value data, and plotting a standard curve of the content of each sulfur-containing compound with the concentration of each sulfur-containing compound as a vertical coordinate and the corresponding response peak area value of each sulfur-containing compound as a horizontal coordinate.

* * * * *